United States Patent
Kida

(10) Patent No.: US 11,776,309 B2
(45) Date of Patent: Oct. 3, 2023

(54) IMAGE PROCESSING METHOD, IMAGE PROCESSING APPARATUS AND NON-TRANSITORY COMPUTER READABLE MEDIUM

(71) Applicant: Roland Corporation, Shizuoka (JP)

(72) Inventor: Atsushi Kida, Shizuoka (JP)

(73) Assignee: Roland Corporation, Shizuoka (JP)

( * ) Notice: Subject to any disclaimer, the term of this patent is extended or adjusted under 35 U.S.C. 154(b) by 101 days.

(21) Appl. No.: 17/242,287

(22) Filed: Apr. 27, 2021

(65) Prior Publication Data

US 2021/0334527 A1 Oct. 28, 2021

(30) Foreign Application Priority Data

Apr. 28, 2020 (JP) .................................. 2020-079060
Apr. 28, 2020 (JP) .................................. 2020-079062

(51) Int. Cl.
*G06V 40/16* (2022.01)
*G06T 7/11* (2017.01)
(Continued)

(52) U.S. Cl.
CPC .............. *G06V 40/164* (2022.01); *G06T 7/11* (2017.01); *G06T 7/73* (2017.01); *G06V 10/25* (2022.01);
(Continued)

(58) Field of Classification Search
CPC ...... H04N 23/611; H04N 23/635; G06T 7/11; G06T 7/73; G06T 2207/10016;
(Continued)

(56) References Cited

U.S. PATENT DOCUMENTS

| 7,949,188 B2 * | 5/2011 | Wu | G06V 20/40 |
| | | | 707/705 |
| 2020/0401812 A1* | 12/2020 | Cheng | G06N 3/0454 |
| 2021/0174519 A1* | 6/2021 | Bazarevsky | G06T 7/75 |

FOREIGN PATENT DOCUMENTS

| JP | H05122689 | 5/1993 |
| JP | H07140527 | 6/1995 |

(Continued)

OTHER PUBLICATIONS

"Office Action of Europe Counterpart Application", dated Jun. 21, 2022, p. 1-p. 4.

(Continued)

*Primary Examiner* — Katrina R Fujita
(74) *Attorney, Agent, or Firm* — JCIPRNET

(57) ABSTRACT

A non-transitory computer readable medium storing an image processing program causing a computer to execute image processing, the image processing program causing the computer to execute: a person storage step of storing a person region that is a region that includes a person detected in a frame image and is smaller than the frame image; an image acquisition step of acquiring the frame image from a moving image; a detection region setting step of setting a detection region that is a region based on the person region stored in the person storage step in the frame image acquired in the image acquisition step; and a person detection step of detecting the person from the detection region set in the detection region setting step.

23 Claims, 13 Drawing Sheets

(51) Int. Cl.
   *G06T 7/73* (2017.01)
   *G06V 40/10* (2022.01)
   *H04N 23/611* (2023.01)
   *H04N 23/63* (2023.01)
   *G06V 10/25* (2022.01)
   *G06V 20/40* (2022.01)

(52) U.S. Cl.
   CPC ............ *G06V 20/40* (2022.01); *G06V 40/103* (2022.01); *G06V 40/161* (2022.01); *H04N 23/611* (2023.01); *H04N 23/635* (2023.01); *G06T 2207/10016* (2013.01); *G06T 2207/30196* (2013.01)

(58) Field of Classification Search
   CPC .......... G06T 2207/30196; G06V 10/25; G06V 20/40; G06V 40/103; G06V 40/161; G06V 40/164
   See application file for complete search history.

(56) References Cited

FOREIGN PATENT DOCUMENTS

| | | |
|---|---|---|
| JP | H1051755 | 2/1998 |
| JP | 2012156752 | 8/2012 |
| WO | 2020011014 | 1/2020 |

OTHER PUBLICATIONS

"Search Report of Europe Counterpart Application", dated Oct. 1, 2021, p. 1-p. 7.

* cited by examiner

FIG. 6(a)

region expansion table 31b

| part | top | bottom | left | right |
|---|---|---|---|---|
| vocal | 10% | 10% | 10% | 10% |
| guitar | 10% | 10% | 10% | 10% |
| keyboard | 5% | 5% | 5% | 5% |
| drum | 5% | 5% | 5% | 5% |

FIG. 6(b)

detected person table 32c

| No. | whole body region Ba | | face region Fa | | vector data |
|---|---|---|---|---|---|
| | reliability (%) | whole body region information | reliability (%) | face region information | |
| 1 | 98 | Bd11 | 91 | Fd11 | V11 |
| 2 | 95 | Bd12 | 92 | Fd12 | V12 |
| ... | | | | | |
| 10 | 84 | Bd20 | 88 | Fd20 | V20 |
| 11 | 82 | Bd21 | 82 | Fd21 | V21 |
| ... | | | | | |

FIG. 6(c)

whole body region information Bd1

| item | setting value |
|---|---|
| Coordinate(X,Y) | (200,180) |
| size (height, width) | (400,180) |

FIG. 6(d)

face region information Fd1

| item | setting value |
|---|---|
| Coordinate(X,Y) | (202,233) |
| size (height, width) | (80,179) |
| face orientation(Yo,Ro,Pi) | (10°, 3°, 7°) |

FIG. 6(e)

performer table 32d

| No. | registration time information | | | | | current information | | | | | deletion counter |
|---|---|---|---|---|---|---|---|---|---|---|---|
| | whole body region Ba | | face region Fa | | vector data | whole body region Ba | | face region Fa | | vector data | part |
| | reliability (%) | whole body region information | reliability (%) | face region information | | reliability (%) | whole body region information | reliability (%) | face region information | | |
| 1 | 99 | Bd1 | 94 | Fd1 | V1 | 98 | Bd11 | 91 | Fd11 | V11 | vocal | 150 |
| 2 | 97 | Bd2 | 95 | Fd2 | V2 | 95 | Bd12 | 92 | Fd12 | V12 | guitar | 150 |
| ... | | | | | | | | | | | | |

IMAGE PROCESSING METHOD, IMAGE PROCESSING APPARATUS AND NON-TRANSITORY COMPUTER READABLE MEDIUM

CROSS-REFERENCE TO RELATED APPLICATION

This application claims the priority benefit of Japan application serial no. 2020-079060, filed on Apr. 28, 2020 and Japan application serial no. 2020-079062, filed on Apr. 28, 2020. The entirety of each of the above-mentioned patent applications is hereby incorporated by reference herein and made a part of this specification.

BACKGROUND

Technical Field

The disclosure relates to an image processing program, an image processing method and an image processing apparatus.

Description of Related Art

Patent Document 1 discloses a technique in which all images acquired by a camera 11 and stored in a frame memory 2 are thinned out at intervals of a predetermined number of pixels, and positions of a face and a body of a person are detected by a face position detection circuit 14 and a person position detection circuit 15 by using the thinned-out images. Since the thinned-out images have a capacity smaller than that of images stored in the frame memory 2, processing loads required to detect positions of a face and a body of a person in the face position detection circuit 14 and the person position detection circuit 15 can be reduced, and thus it is possible to quickly detect positions of the face and the body of the person.

PATENT DOCUMENTS

[Patent Document 1] Japanese Patent Laid-Open No. H10-051755 (for example, paragraph 0020 and FIG. 2)

However, the thinned-out images are obtained by thinning out all images stored in the frame memory 2, and thus a resolution thereof is lower than that of the images stored in the frame memory 2. Consequently, details in the thinned-out images are lost. Therefore, there is a problem in that, in a case where a person is to be detected by the face position detection circuit 14 and the person position detection circuit 15, a person cannot be detected even though the person is present in a thinned-out image, and another object in the thinned-out image is erroneously detected as the person.

SUMMARY

According to an embodiment, there is provided a non-transitory computer readable medium storing an image processing program causing a computer to execute image processing, the image processing program causing the computer to execute: a person storage step of storing a person region that is a region that includes a person detected in a frame image and is smaller than the frame image; an image acquisition step of acquiring the frame image from a moving image; a detection region setting step of setting a detection region that is a region based on the person region stored in the person storage step in the frame image acquired in the image acquisition step; and a person detection step of detecting the person from the detection region set in the detection region setting step.

According to an embodiment, there is provided an image processing apparatus including: a person storage part that stores a person region that is a region that includes a person detected in a frame image and is smaller than the frame image; an image acquisition part that acquires the frame image from a moving image; a detection region setting part that sets a detection region that is a region based on the person region stored in the person storage part in the frame image acquired by the image acquisition part; and a person detection part that detects the person from the detection region set by the detection region setting part.

According to an embodiment, there is provided an image processing method including: storing a person region that is a region that includes a person detected in a frame image and is smaller than the frame image; acquiring the frame image from a moving image; setting a detection region that is a region based on the stored person region in the acquired frame image; and detecting the person from the set detection region.

BRIEF DESCRIPTION OF THE DRAWINGS

FIG. 6(a) is a diagram schematically illustrating a region expansion table, FIG. 6(b) is a diagram schematically illustrating a detected person table, FIG. 6(c) is a diagram schematically illustrating whole body region information, FIG. 6(d) is a diagram schematically illustrating face region information, and FIG. 6(e) is a diagram schematically illustrating a performer table.

DESCRIPTION OF THE EMBODIMENTS

The disclosure provides an image processing method, an image processing apparatus and non-transitory computer readable medium capable of detecting a person in a frame image with high accuracy.

Figure 1:
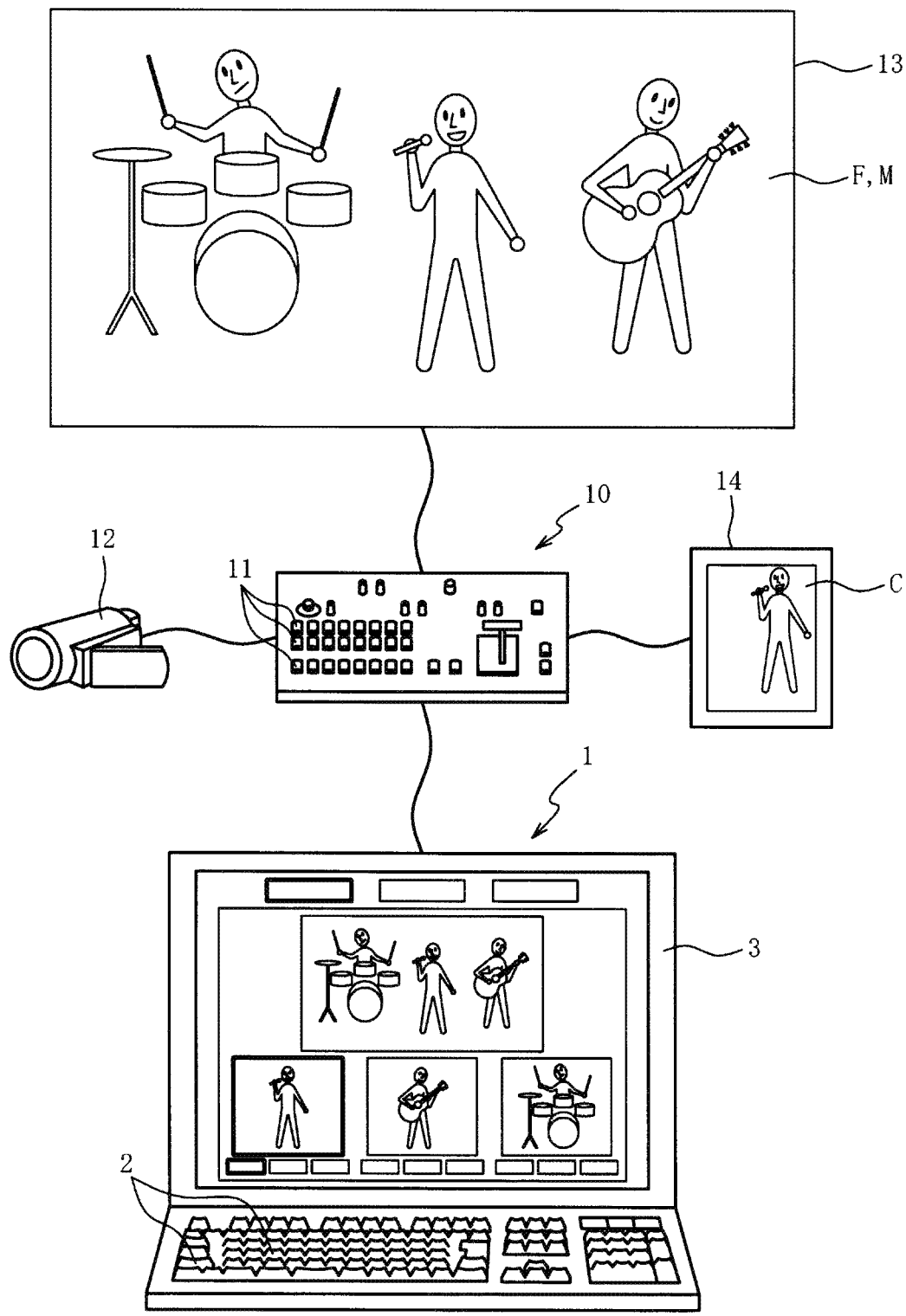
FIG. 1 is an exterior diagram of a PC.

Hereinafter, a preferred embodiment will be described with reference to the accompanying drawings. With reference to FIG. 1, an outline of a PC 1 of the present embodiment will be described. FIG. 1 is an exterior diagram of the PC 1. The PC 1 is an information processing apparatus (computer) that cuts out a person region E (refer to FIG. 2(a)) including persons H from a frame image F that is input from a switcher 10 that will be described later, and outputs a cutout region C obtained by expanding the cutout person region E as necessary to the switcher 10. The PC 1 is provided with an input device 2 to which an instruction from a user is input and a display device 3 that displays the frame image F that is input from the switcher 10 or the cutout person region E. The PC 1 is connected to the switcher 10.

The switcher 10 is an apparatus (image processing apparatus) that outputs a plurality of moving images M that is input from a 4K camera 12 that will be described later or a hard disk (not illustrated), in a switching manner in response to an instruction from the user. The switcher 10 is provided with an input device 11 to which an instruction from the user is input. The switcher 10 is connected to the 4K camera 12, an operation monitor 13, and an external monitor 14.

The 4K camera 12 is a device that inputs the moving images M (frame images F) having a 4K resolution (horizontal direction: 3840 pixels and vertical direction: 2160 pixels). The operation monitor 13 is a device that displays the moving images M or the like acquired from the 4K camera 12 or the hard disk, and the external monitor 14 is a device that displays moving images based on the cutout region C received from the PC 1, or moving images, images, or the like output from the switcher 10 in response to an instruction from the user via the input device 11.

The switcher 10 transmits the moving images M acquired from the 4K camera 12 to the PC 1. The PC 1 acquires the frame image F that is an image forming the moving images M from the moving images M received from the switcher 10. The person H included in the frame image F is detected, and the person region E including the detected person H is set. The cutout region C is set by expanding the set person region E according to a part of which the person H is in charge and an orientation of the person H, and the set cutout region C is transmitted to the switcher 10.

The switcher 10 cuts out the moving images M acquired from the 4K camera 12 by using the cutout region C received from the PC 1, and outputs the cutout moving images to the external monitor 14. Consequently, the moving images based on the person H detected by the PC 1 from the moving images M are output to the external monitor 14.

Labor saving and budget reduction are required for live production, or recording and distribution of live videos or the like, and the tendency of "one-man operation" in which one worker performs work related to video processing that was performed by a plurality of workers in the related art has come to be seen. In order to perform the one-man operation using the configuration of the related art, a plurality of pan/tilt/zoom (PTZ) cameras may be arranged to be switched as appropriate. However, in this method, a plurality of PTZ cameras are required, which increases the cost, and a single worker has to operate the plurality of PTZ cameras, and thus the workload on the worker is increased.

Therefore, in the PC 1 of the present embodiment, the frame image F is acquired from the moving images M that are an ultra-high resolution (4K resolution) video acquired from the 4K camera 12 via the switcher 10, the cutout region C based on the person H included in the frame image F is set, and the set cutout region C is transmitted to the switcher 10. In the switcher 10, a moving image is cut out on the basis of the cutout region C, and the cutout moving image is output to the external monitor 14. In other words, in the PC 1, the cutout regions C are switched as appropriate, and thus moving images (scenes) to be output to the external monitor 14 can be switched. Consequently, it is possible to perform video performance as if a plurality of PZT cameras were used without switching the provided cameras.

Figure 2A:
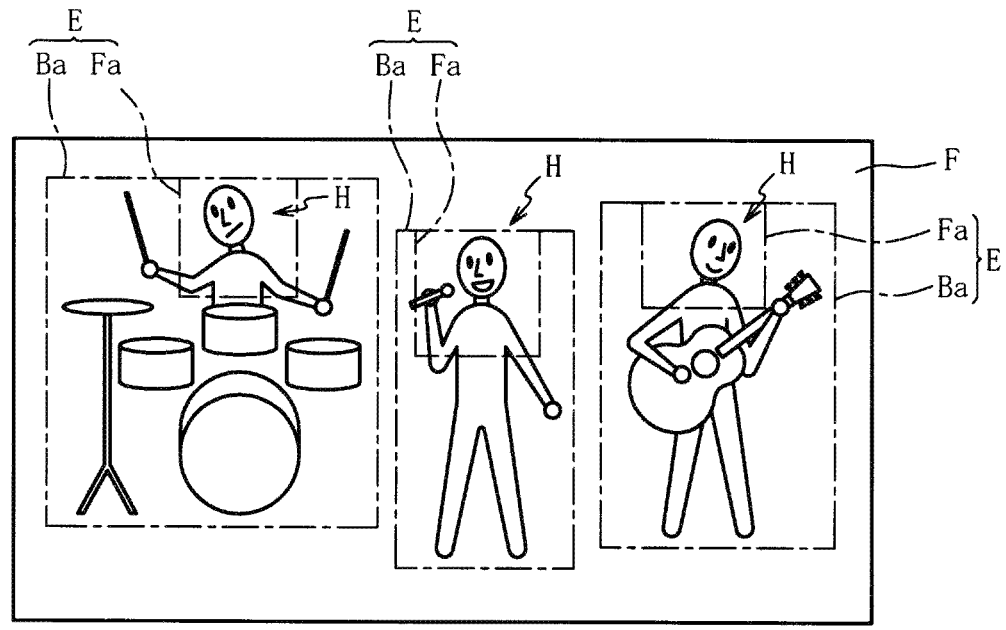
FIG. 2(a) is a diagram for describing a person region in a frame image.

Next, with reference to FIGS. 2 and 3, a method of setting the person region E and the cutout region C in the PC 1 will be described. First, with reference to FIG. 2(a), the person region E will be described. FIG. 2(a) is a diagram for describing the person region E in the frame image F. The PC 1 sets the person region E of each person H included in the frame image F from the frame image F. In the frame image F, a vocalist (singer) or a performer of a musical instrument such as a guitar or a drum in a band is recorded, and the person H detected by the PC 1 of the present embodiment is handled as the vocalist or the performer of the musical instrument.

The PC 1 sets the person region E for the person H detected from the frame image F. The person region E includes, for example, a whole body region Ba and a face region Fa. The whole body region Ba is a rectangular region smaller than the frame image F formed to include the whole body of the person H. As a method of setting the whole body region Ba, first, a rectangular region including the whole body of each person H in the frame image F is detected from the frame image F by using person recognition inference in the well-known technique, and a musical instrument played by the person H is detected from a shape of the musical instrument that is detected from the detected whole body region of the person H by using image recognition in the well-known technique.

The whole body region of the person H is multiplied by an expansion ratio that is set in advance according to the musical instrument played by the person H, and thus the whole body region of the person H is expanded, so that a region including the expanded whole body region of the person H and the musical instrument played by the person H is set as the whole body region Ba. Consequently, the whole body region Ba includes the person H playing the musical instrument and the musical instrument played by the person H, and thus the whole body region Ba can be an appropriate region of a target performer.

The face region Fa is a rectangular region formed to include the face of the person H. As a method of setting the face region Fa, first, the face of the person H is detected from an image of a region corresponding to 30% of the upper part of the whole body region Ba by using the face recognition inference in the well-known technique. The rectangular region including the detected face of the person H is set as the face region Fa. Of the whole body region Ba and the face region Fa of the event person region E set in the above-described way, a region selected by a worker of the PC 1 via the input device 2 is set to the cutout region C to be output to the switcher 10.

The whole body region Ba and the face region Fa are not limited to rectangular shapes, and may have other shapes such as circular shapes or polygonal shapes. The facial region Fa is not limited to being detected from a region corresponding to 30% of the upper part of the whole body region Ba, and may be a region corresponding to 30% or more of the upper part or a region corresponding to 30% or less of the upper part.

Next, with reference to FIG. 2(*b*), a method of detecting the person H from the frame image F will be described. FIG. 2(*b*) is a diagram for describing detection of the person H from the frame image F. When the person H is detected from the frame image F, the person H is detected from a detection region Da set in the frame image F. The detection region Da is a region that is set from the person region E detected in the past in the frame image F. As will be described later in detail, the person region E detected in the past on the basis of the frame image F of the same moving image M can be stored (a performer table 32*d* that will be described later in FIG. 6(*e*)), and the detection region Da is formed in a rectangular shape to include the stored person region E.

In other words, the detection region Da is set in the past frame image F in a range in which the person H is present. Since there is a high probability that the person H may also be present in the current frame image F that is acquired from the moving images M in the detection region Da set in the above-described way, the person H is detected from such a detection region Da, and thus the person H can be detected from the detection region Da, that is, the frame image F with high accuracy and with high efficiency.

In a case where the person region E was not detected from the frame image F in the past, the person H is detected from the entire frame image F. The person region E of the person H detected from the entire frame image F is stored, and the stored person region E is used to detect the person H from the subsequent frame image F. The detection region Da is not limited to a rectangular shape, and may have other shapes such as a circular shape or a polygonal shape. Detection of the person H is not limited to using the detection region Da, and, for example, the person H may be detected from the entire frame image F at all times.

A foot region Ft that is a rectangular region (specific range) that is set by the user via the input device 2 is further provided in the frame image F. Among the persons H detected from the detection region Da or the entire frame image F, the person H whose feet are present in the foot region Ft is specified as the person H of which the person region E is set. Since the foot region Ft is set as described above, in the frame image F, performers lined up on a stage are specified as the persons H of which the person regions E are set, and people H outside the stage, for example, the audience outside the stage, are not specified as the person H of which the person region E is set. Consequently, it is possible to easily and reliably specify a performer located on the stage as the person H whose person region E is set from the frame image F.

The foot region Ft is not limited to a region set for the feet of the person H in the frame image F, and may be provided at other body parts of the person H, for example, a position corresponding to the head or the arm thereof. In this case, the person H whose head or arm is located in the foot region Ft in the detection region Da or the like is specified as the person H forming the person region E. The foot region Ft is not limited to a rectangular shape, and may have other shapes such as a circular shape or a polygonal shape.

As described above, the cutout region C to be output to the switcher 10 is set from the person region E based on the person H detected from the frame image F. With reference to FIG. 3, a method of setting the cutout region C will be described.

Figure 3A:
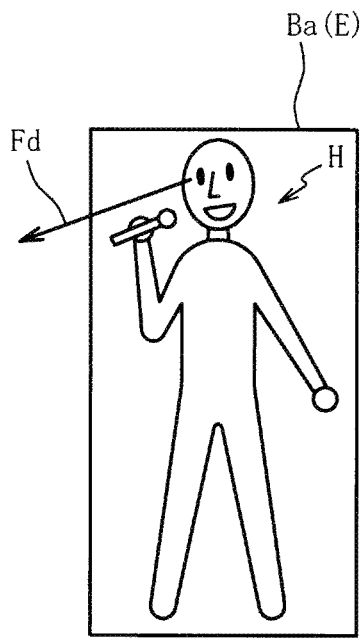
FIG. 3(a) is a diagram illustrating a person region that is set in a cutout region.

FIG. 3(*a*) is a diagram illustrating the person region E set in the cutout region C. the whole body region Ba is exemplified as the person region E to be set in the cutout region C illustrated in FIGS. 3(*a*) and 3(*b*), but a method of setting the face region Fa in the cutout region C is the same, and thus description thereof will not be repeated.

As the cutout region C, a region is set by further expanding the person region E according to the person H included in the person region E serving as a source of the cutout region C. Specifically, the person region E is expanded according to a part of which the person H is in charge and an orientation of the face of the person H included therein.

First, expansion of the cutout region C from the person region E according to a part of which the person H is in charge will be described. First, the part of which the person H is in charge is detected from a musical instrument played by the person H included in the person region E. In a case where the detected part is vocal or a guitar, a region in which the person region E is expanded by 10% in each of the top, the bottom, the left, and the right is set as the cutout region C, and, in a case where the detected part is a keyboard or a drum, a region in which each of the top, the bottom, the left, and the right of the person region E is expanded by 5% is set as the cutout region C (refer to region expansion table 31*b* in FIG. 6(*a*)).

In other words, in a case where the person H included in the person region E is a vocalist or a guitarist, an expansion ratio higher than in a case of the keyboard or the drum is set, and thus the cutout region C is expanded to be large. Therefore, even if a person of a part with a relatively large movement such as vocal or a guitar moves, it is possible to suppress the person from being out of a range of the cutout region C.

On the other hand, in a case where the person H included in the person region E is a keyboarder or a drummer, an expansion ratio lower than in a case of vocal or a guitar is set. There is a low probability that the person H of a part with a relatively small movement such as a keyboard or a drum may be out of a range of the person region E that is a region including the person H and a musical instrument played by the person H. Therefore, since expansion of the cutout region C in a case of the keyboard or the drum is minimized, a reduction in a size occupied by the person H in the cutout region C can be suppressed, and a decrease in the visibility of the person H in the cutout region C can be suppressed.

Next, with reference to FIGS. 3(*a*) and 3(*b*), expansion of the cutout region C from the person region E according to an orientation of the person H will be described. FIG. 3(*b*) is a diagram for describing setting of the cutout region C, and FIG. 3(*c*) is a diagram for describing correction of an orientation Fd of the face of the person H in accordance with an angle of view 2θ of the frame image F.

As illustrated in FIG. 3(*b*), the orientation Fd of the face of the person H included in the person region E is detected from the person region E, and the cutout region C that is expanded according to a part is further expanded in the orientation Fd. Such an orientation Fd of the person H represents a direction in which the person H will move in the future. Therefore, since the cutout region C is expanded in such a direction, even if the person H suddenly moves in the direction, it is possible to suppress the person H from being out of a range of the cutout region C.

Since the cutout region C is expanded in the orientation Fd, it is possible to minimize a reduction in a size of the person H compared with a case where the entire person region E is zoomed out from. Consequently, even in a case where the cutout region C is expanded in the orientation Fd of the person H, it is possible to suppress a decrease in the visibility of the person H in the cutout region C.

In the present embodiment, the cutout region C is expanded in the orientation Fd in a case where a part of which the person H included in the cutout region C is in charge is vocal or a guitar. The person H who is in charge of vocal or a guitar with a large movement frequently moves in the orientation Fd of the face. Therefore, since the cutout region C is expanded in such an orientation Fd, it is possible to more preferably suppress the person H from being out of a range of the cutout region C when the person moves.

Expansion of the cutout region C in the orientation Fd is not limited to a case where a part of the person H is vocal or a guitar, and may be applied to other parts such as a drum or a keyboard. An orientation in which the cutout region C is expanded is not limited to the orientation Fd of the face, and may be, for example, an orientation of the upper half or the lower half of the body of the person H or a visual line of the person H, and may be an orientation of the nose of the person H.

Figure 3B:
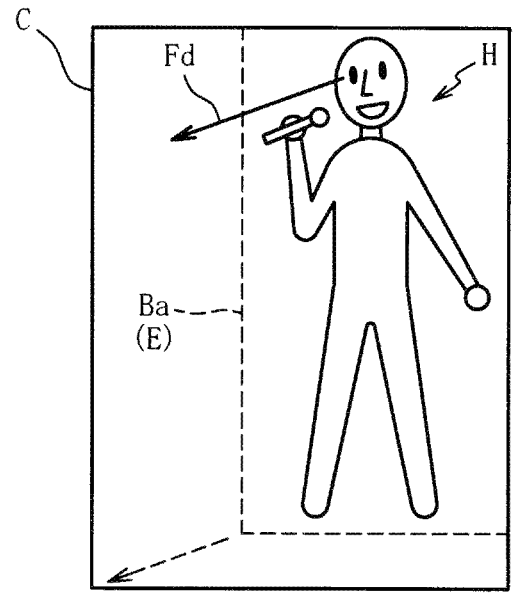
FIG. 3(b) is a diagram for describing the cutout region.
Figure 3C:
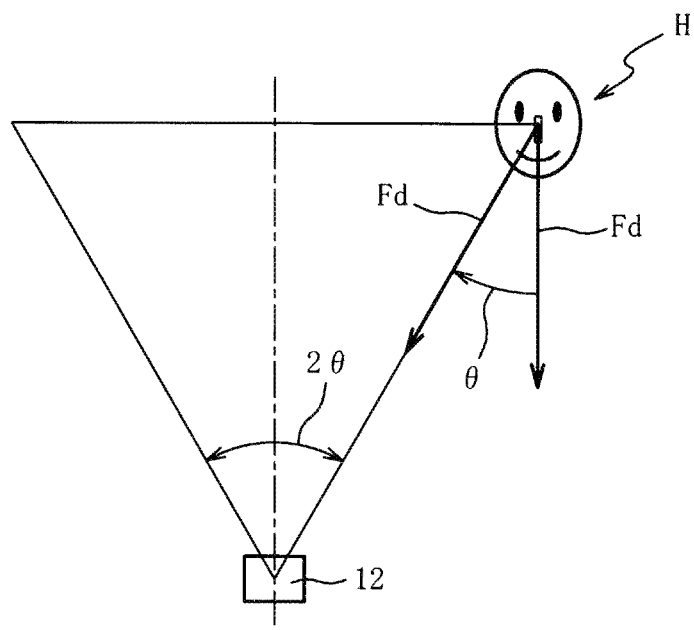
FIG. 3(c) is a diagram for describing correction of an orientation of a person's face in accordance with an angle of view of a frame image.

However, the orientation Fd of the face of the person H acquired from the frame image F is biased according to a position of the person H in the frame image F. Specifically, as illustrated in FIG. 3(c), in a case where the person H is imaged by the 4K camera 12, the angle of view 2θ of the person H in the frame image F differs depending on a position of the person H. Consequently, even in a case where the person H who is a performer actually faces forward on the stage, the person H is recorded on the moving image M and the frame image F such that the orientation Fd of the face is tilted by half an angle θ of the angle of view 2θ.

Figure 2B:
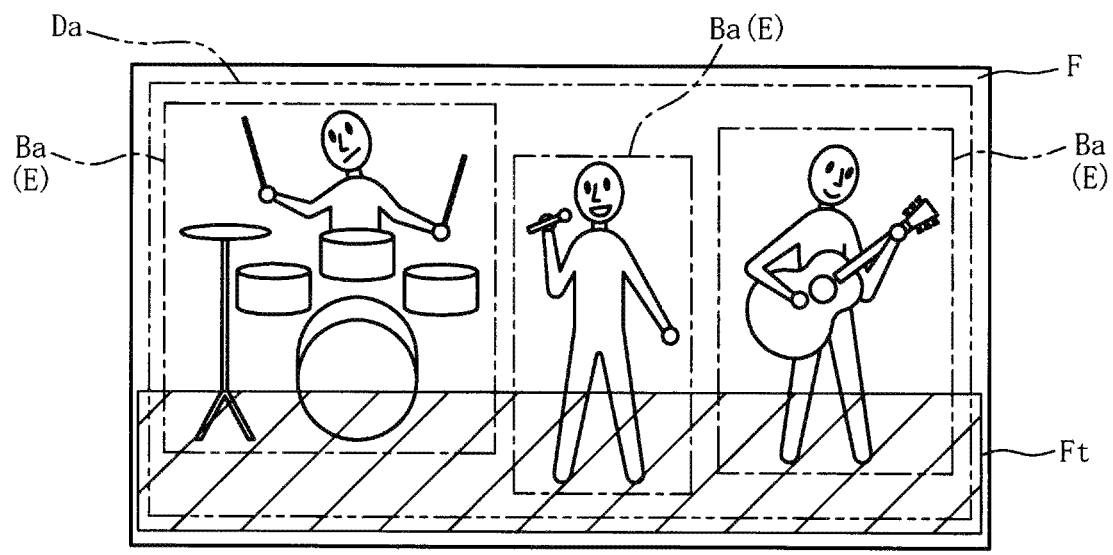
FIG. 2(b) is a diagram for describing detection of a person from the frame image.

When the cutout region C is expanded in the orientation Fd of the face described in FIG. 2(b) in this state, the cutout region C is excessively expanded by the angle θ corresponding to the angle of view 2θ of the person H. Therefore, there is concern that the cutout region C may become unnecessarily large, or the cutout region C may be expanded in an unnatural direction in which the person H is not actually facing. Therefore, when the cutout region C is expanded in the orientation Fd of the face, the orientation Fd of the face is corrected by the angle θ that is half of the angle of view 2θ of the person H, and thus the bias of the orientation Fd of the face of the person H corresponding to the angle of view 2θ is corrected such that the cutout region C can be expanded in a direction in which the person H actually faces.

As described above, the cutout region C is set by expanding the person region E according to a part of which the person H is in charge and the orientation Fd of the face. Consequently, it is possible to suppress the person H included in the cutout region C from being out of a range thereof due to movement, and thus the cutout region C can be an appropriate region including the person H.

Figure 4:
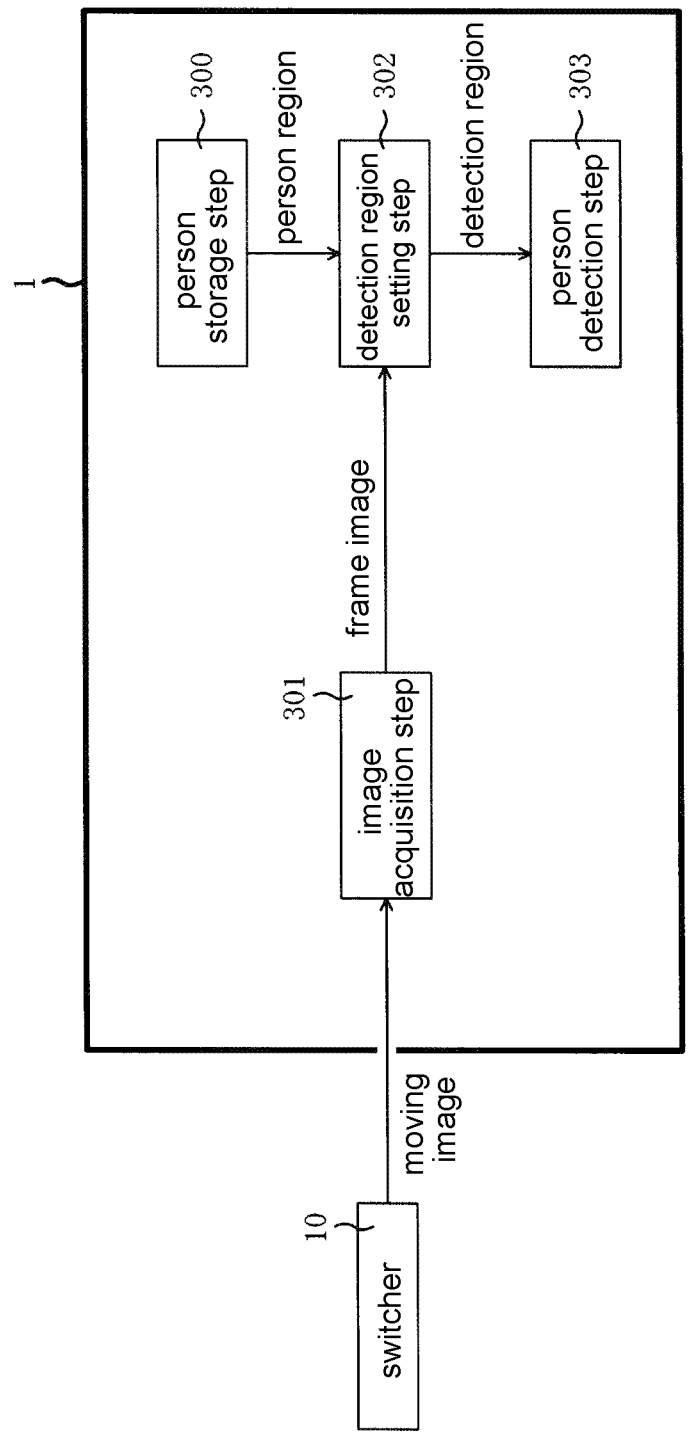
FIG. 4 is a functional block diagram of the PC.

Next, with reference to FIG. 4, functions of the PC 1 will be described. FIG. 4 is a functional block diagram of the PC 1. As illustrated in FIG. 4, the PC 1 has a person storage step 300, an image acquisition step 301, a detection region setting step 302, and a person detection step 303.

Figure 5:
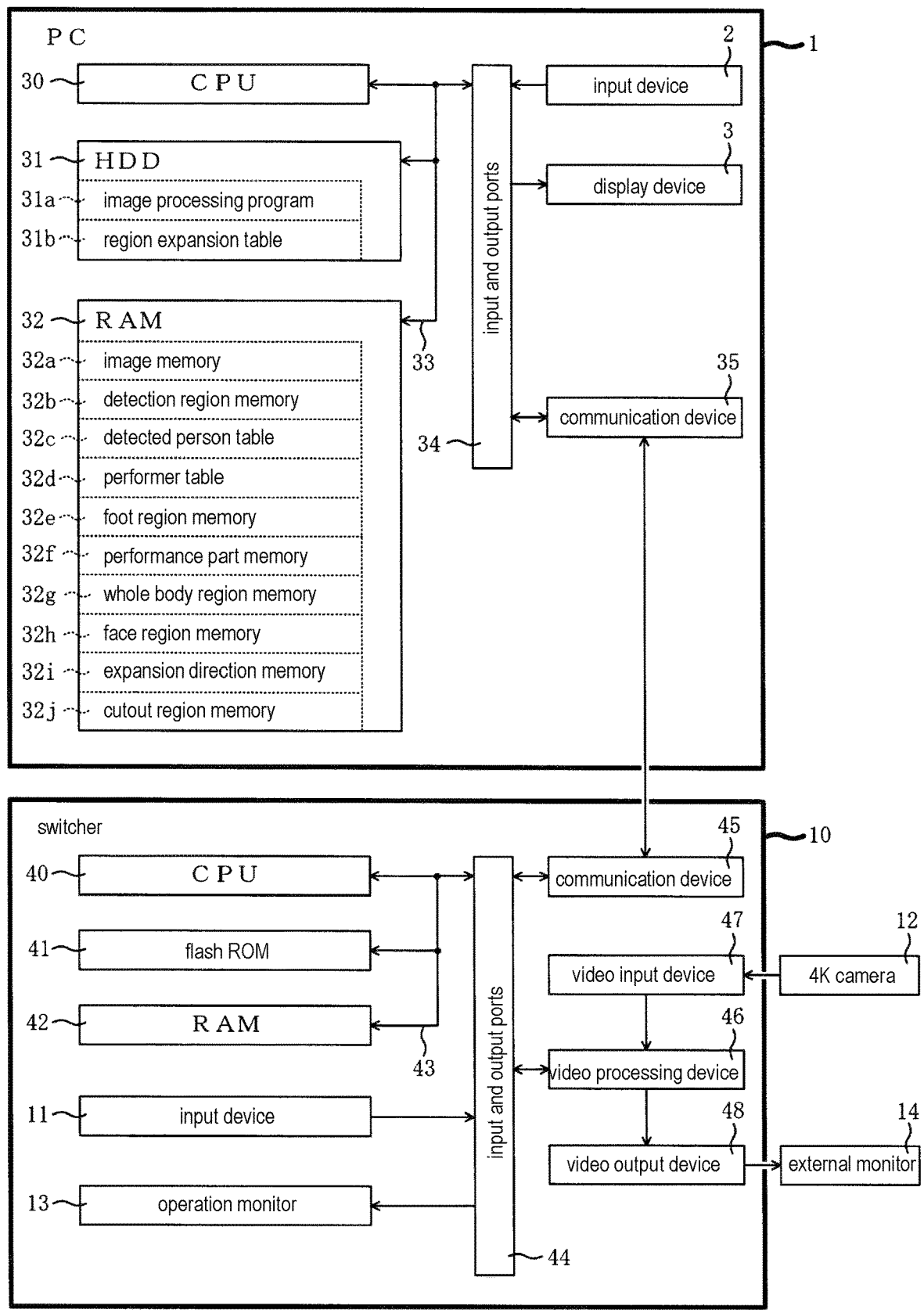
FIG. 5 is a block diagram illustrating an electrical configuration of the PC and a switcher.

The person storage step 300 is a function of storing the person region E that is a region that includes the person H detected in the frame image F and is smaller than the frame image F, and is realized by a CPU 30 that will be described later in FIG. 5. The image acquisition step 300 is a function of acquiring the frame image F from the moving images M that are acquired from the switcher 10, and is realized by the CPU 30. The detection region setting step 302 is a function of setting the detection region Da that is a region based on the person region E stored in a person storage part in the frame image F acquired in the image acquisition step 301, and is realized by the CPU 30. The person detection step 303 is a function of detecting the person H from the detection region Da set in the detection region setting step 302, and is realized by the CPU 30.

In the PC 1, the detection region Da is set on the basis of the person region E stored in the person storage step 300, and the person H is detected from the detection region Da. The person region E is a region smaller than the frame image F, and thus the detection region Da set on the basis of the person region E is smaller than the frame image F. Therefore, a size of the person H included in the detection region Da relative to the detection region Da is larger than that of the same person H included in the frame image F relative to the frame image F. Consequently, even if an image based on the detection region Da is changed (particularly, reduced) to the predetermined size, it is possible to suppress the loss of details of the person H in the changed image, and thus the person H can be detected from the image based on the detection area Da with high accuracy.

Next, with reference to FIGS. 5 and 6, an electrical configuration of the PC 1 and the switcher 10 will be described. FIG. 5 is a block diagram illustrating an electrical configuration of the PC 1 and the switcher 10. AS illustrated in FIG. 5, the PC 1 has the CPU 30, a hard disk drive (HDD) 31, and a RAM 32, and these constituents are respectively connected to input and output ports 34 via a bus line 33. The input device 2 and the display device 3, and a communication device 35 that performs data transmission and reception with the switcher 10 are further connected to the input and output ports 34.

Figure 7:
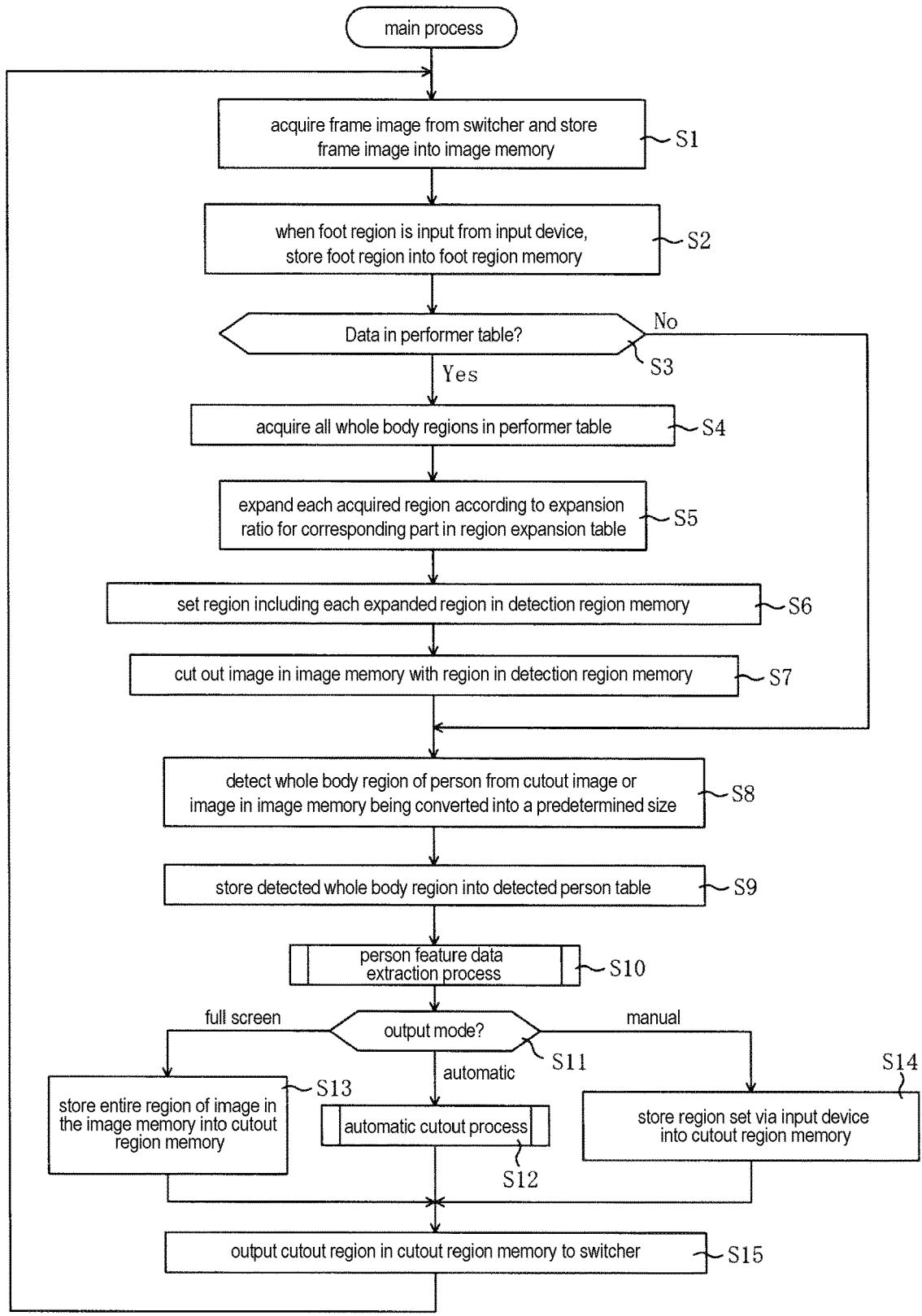
FIG. 7 is a flowchart illustrating a main process.

The CPU 30 is a calculation device that controls the respective constituents that are connected to each other via the bus line 33. The HDD 31 is a rewritable nonvolatile storage device that stores programs executed by the CPU 30 or fixed value data, and stores an image processing program 31a and a region expansion table 31b. When the image processing program 31a is executed in the CPU 30, a main process illustrated in FIG. 7 is executed.

The region expansion table 31b is a data table storing an expansion ratio for expanding the person region E or the cutout region C for each part of which the person H included in the person region E or the cutout region C is in charge. With reference to FIG. 6(a), the region expansion table 31b will be described.

FIG. 6(a) is a diagram schematically illustrating the region expansion table 31b. As illustrated in FIG. 6(a), the region expansion table 31b stores an expansion ratio for expanding the top, the bottom, the left, and the right of the rectangular person region E or cutout region C for each part of which the person H is in charge. In the region expansion table 31b in FIG. 6(a), in a case where the part is vocal or a guitar, 10% is set as an expansion ratio for each of the top, the bottom, the left, and the right of the person region E and the like. In a case where the part is a keyboard or a drum, 5% is set as an expansion ratio for each of the top, the bottom, the left, and the right of the person region E.

Expansion ratios stored in the region expansion table 31b are not limited to the above expansion ratios, and may be set as appropriate according to a movement amount of the person H in charge of each part. Parts stored in the region expansion table 31b are not limited to vocal, a guitar, a keyboard, and a drum, and may include parts of other musical instruments such as a base or a shoulder keyboard.

Values in the region expansion table 31b may be different values in the top, the bottom, the left, and the right. Particularly, since the person H who is a performer tends to move left and right more than up and down, it is desirable that the values in the region expansion table 31b are greater in the left and the right than in the top and the bottom.

FIG. 5 is referred to again. The RAM 32 is a memory that stores various pieces of work data, flags, and the like in a rewritable manner when the CPU 30 executes the image processing program 31a, and includes an image memory 32a storing the frame image F, a detection region memory 32b storing the detection region Da (refer to FIG. 2(b)), a detected person table 32c, a performer table 32d, a foot region memory 32e storing the foot region Ft (refer to FIG. 2(b)), a performance part memory 32f storing a part of which the person H is in charge, a whole body region memory 32g, a face region memory 32h, an expansion direction memory 32i storing a direction in which the cutout region C is expanded, and a cutout region memory 32j storing the cutout region C (refer to FIG. 3(b)).

Next, with reference to FIGS. 6(b) to 6(e), the detected person table 32c and the performer table 32d will be described. FIG. 6(b) is a diagram schematically illustrating the detected person table 32c. The detected person table 32c is a data table storing information regarding the detected person H when the person H is detected from the frame image F acquired from the moving images M.

As illustrated in FIG. 6(b), the whole body region Ba, the face region Fa, and vector data are stored in correlation with each other for each person H detected from the frame image F in the detected person table 32c.

Information regarding the whole body region Ba of the person H acquired from the frame image F is stored in the whole body region Ba. Specifically, a "reliability" representing the human-likeness of the person H included in the whole body region Ba and whole body region information including a position and a size of the whole body region Ba are stored. The whole body region information will be described with reference to FIG. 6(c).

FIG. 6(c) is a diagram schematically illustrating whole body region information Bd1. In FIG. 6(c), the whole body region information will be described by exemplifying the whole body region information Bd1 stored in "No. 1" of the detected person table 32c, but the same configuration is applied to other whole body region information, and thus description thereof will not be repeated. As illustrated in FIG. 6(c), "coordinates" that are left and top coordinates of the rectangular whole body region Ba and a "size" corresponding to a height and a width of the whole body region Ba are stored in the whole body region information Bd1.

FIG. 6(b) is referred to again. Information regarding the face region Fa of the person H acquired from the frame image F is stored in the face region Fa. Specifically, a "reliability" representing the human-likeness of the person H included in the face region Fa and face region information including a position and a size of the face region Fa and an orientation of the face of the person H are stored. The face region information will be described with reference to FIG. 6(d).

FIG. 6(d) is a diagram schematically illustrating face region information Fd1. In FIG. 6(d), the face region information will be described by exemplifying the face region information Fd1 stored in "No. 1" of the detected person table 32c, but the same configuration is applied to other face region information, and thus description thereof will not be repeated. As illustrated in FIG. 6(d), "coordinates" that are left and top coordinates of the rectangular face region Fa, a "size" corresponding to a height and a width of the face region Fa, and a "face orientation" representing the orientation Fd of the face of the person H included in the face region Fa are stored in the face region information Fd1.

As the "face orientation" stored in the face region information Fd1, a yaw angle Yo that is an angle around the crown of the person H, a pitch angle Pi that is an angle around a straight line connecting both ears, and a roll angle Ro that is an angle in a direction orthogonal to the yaw angle Yo and the pitch angle Pi, are set.

FIG. 6(b) is referred to again. Image feature data based on the whole body region Ba is stored in the vector data. In the present embodiment, the image feature data stored in the vector data is calculated on the basis of, for example, an image luminance histogram, but other feature data may be set in the vector data. Calculation of feature data is a well-known technique, and thus detailed description thereof will be omitted. The persons H detected from the frame image F are stored in a descending order of a reliability of the whole body regions Ba thereof in the detected person table 32c.

Next, with reference to FIG. 6(e), the performer table 32d will be described. The performer table 32d is a data table storing information regarding the person H who is continuously detected from the frame image F acquired from the moving images M and is a candidate of the cutout region C to be output to the switcher 10. In the performer table 32d, registration time information in which the whole body region Ba, the face region Fa, and the vector data are stored at the time of registration in the performer table 32d, current information in which the current whole body region Ba, face region Fa, and vector data are stored, a part, and a deletion counter are stored in correlation with each other for each person H continuously detected from the frame image F acquired from the moving images M.

Information configured in the same manner as the whole body region Ba and the face region Fa stored in the detected person table 32c described in FIG. 6(b) is stored in the whole body region Ba and the face region Fa in the registration time information and the current information. A part of which the corresponding person H is in charge is stored in the part. A count value until information regarding the corresponding person H is deleted from the performer table 32d is stored in the deletion counter.

An initial value of the deletion counter is set to "150", and it is checked whether or not the corresponding person H in the performer table 32d is similar to the person H stored in the detected person table 32c when the person H is detected from the frame image F. In a case where the corresponding person H is not similar to any person H stored in the detected person table 32c, a deletion counter for the corresponding person H in the performer table 32d is reduced by 1. Information regarding the person H for which a deletion counter is 0 is deleted from the performer table 32d.

FIG. 5 is referred to again. The whole body region Ba and the face region Fa are respectively stored in the whole body region memory 32g and the face region memory 32h.

Next, an electrical configuration of the switcher 10 will be described. The switcher 10 has a CPU 40, a flash ROM 41, and a RAM 42, and these constituents are respectively connected to input and output ports 44 via a bus line 43. The input device 11 and the operation monitor 13, a communication device 45 that performs data transmission and reception with the PC 1, and a video processing device 46 are further connected to the input and output ports 44.

The CPU 40 is a calculation device that controls the respective constituents that are connected to each other via the bus line 43. The flash ROM 41 is a rewritable nonvolatile storage device that stores programs executed by the CPU 40 or fixed value data 等, and the RAM 42 is a memory that stores various pieces of work data, flags, and the like in a rewritable manner when the CPU 40 executes the programs.

The video processing device 46 is a calculation device that performs image processing in response to an instruction from the CPU 40. The video processing device 46 is connected to a video input device 47 to which an image on which the image processing is performed by the video processing device 46 is input and a video output device 48 that outputs an image subjected to the image processing in the video processing device 46. The video input device 47 is connected to the 4K camera 12, and the moving images M from the 4K camera 12 are input to the video processing device 46 via the video input device 47. The video output device 48 is connected to the external monitor 14, and an image subjected to image processing in the video processing device 46 is output to the external monitor 14 via the video output device 48.

Next, with reference to FIGS. 7 to 12, a main process executed by the CPU 30 of the PC 1 will be described. FIG. 7 is a flowchart illustrating a main process. The main process is a process executed in a case where an instruction for executing the image processing program 31a is given in the PC 1.

In the main process, the moving images M are received from the switcher 10 via the communication device 35, and the latest frame image F in the received moving images M is acquired and is stored into the image memory 32a (S1). After the process in S1, when the foot region Ft is input via the input device 2, the input foot region Ft is stored in the foot region memory 32e (S2).

After the process in S2, it is checked whether information regarding the person H is stored in the performer table 32d (S3). In a case where information regarding the person H is stored in the performer table 32d in the process in S3 (S3: Yes), regions based on all of the whole body regions Ba in the registration time information and the current information stored in the performer table 32d are acquired (S4). In the process in S4, regions acquired from the performer table 32d is not limited to all of the whole body regions Ba in the registration information and the current information, and may be only all of the whole body regions Ba in the registration information, or only all of the whole body regions Ba in the current information. After the process in S4, each acquired region is expanded according to an expansion ratio of a part of which the person H is in charge (S5).

Specifically, for each region acquired in the process in S4, a part of the person H included in the region is acquired from the performer table 32d, an expansion ratio corresponding to the acquired part is acquired from the region expansion table 31b, and the region is expanded according to the acquired expansion ratio. After the process in S5, a rectangular region including each expanded region, that is, the detection region Da is formed, and is stored into the detection region memory 32b (S6). After the process in S6, the image (that is, the frame image F) in the image memory 32a is cut out by the detection region Da (S7). Consequently, the image in the image memory 32a based on the detection region Da in the frame image F acquired in the process in S1 is cut out.

In a case where information regarding the person H is not stored in the performer table 32d in the process in S3 (S3: No), the detection region Da cannot be set, and thus the processes in S4 to S7 are skipped.

After the process in S3 or S7, the image that is cut out in the process in S7 or the image in the image memory 32a in a case where the process in S7 is not executed is converted into an image with a predetermined size (for example, horizontal direction: 640 pixels and vertical direction: 360 pixels), all persons H are detected from the image, and the whole body region Ba of each detected person H is acquired (S8). When such a person H is detected, a reliability representing human-likeness of each person H is also calculated. Detection of the person H in the process in S8 is performed according to a well-known technique which may be, for example, person recognition inference using image recognition based on machine learning. As described with reference to FIG. 2(a), a region including the detected person H and a musical instrument played by the person H is acquired as the whole body region Ba.

Here, the image cut out into a region corresponding to the detection region Da through the processes in S4 to S7 has a size smaller than that of the frame image F in the image memory 32a acquired through the process in S1. This is because the detection region Da is formed from the whole body region Ba smaller than the frame image F.

Therefore, a size, occupying the detection region Da, of the person H included in the detection region Da is larger than that of the same person H recorded in the frame image F. Consequently, even if the detection region Da is changed (particularly, reduced) to the predetermined size, it is possible to suppress the loss of details of the person H in the changed image, and thus the person H can be detected from the detection region Da with high accuracy.

The detection region Da is based on a position of the person H detected from the past frame image F stored in the detected person table 32c, and thus there is a high probability that the person H may be included in the detection region Da. Consequently, it is possible to detect the person H from the detection region Da with high accuracy.

Figure 8:
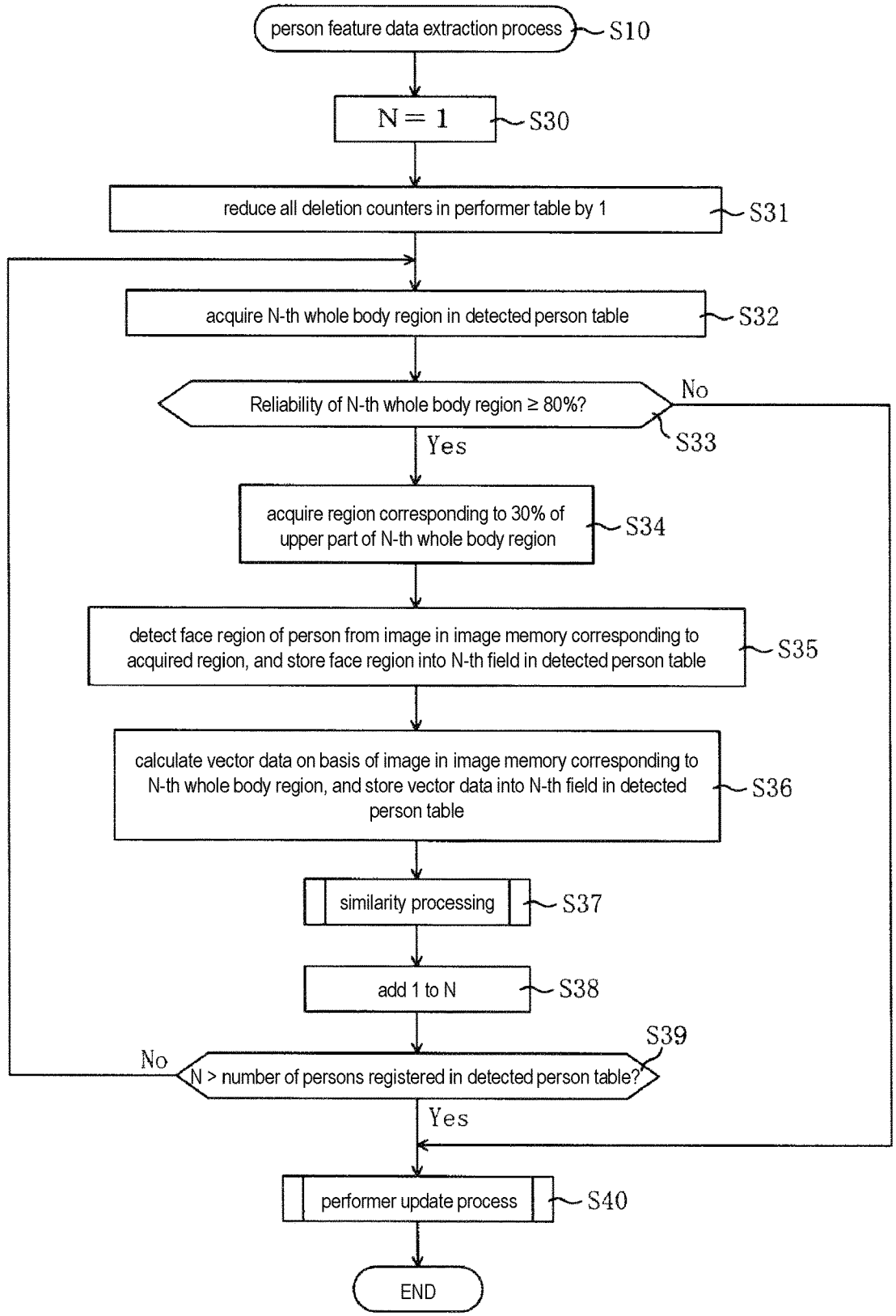
FIG. 8 is a flowchart illustrating a person feature data extraction process.
Figure 9:
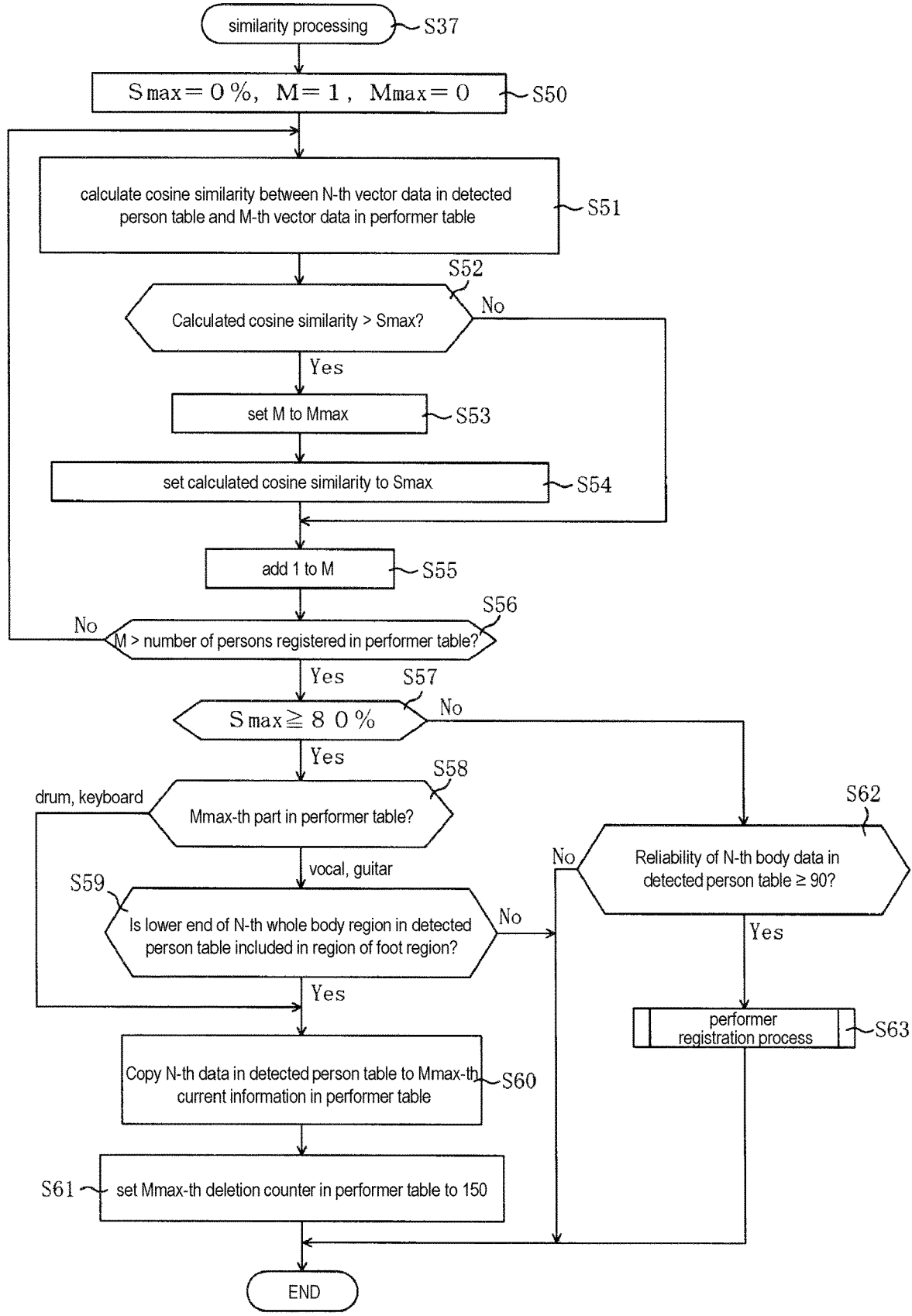
FIG. 9 is a flowchart illustrating similarity processing.

After the process in S8, the whole body region Ba detected in the process in S8 is stored into the detected person table 32c (S9). In a case where the whole body region Ba is stored in the detected person table 32c in the process in S9, a reliability calculated along with detection of the person H in the process in S8 is stored into the detected person table 32c along with the whole body region Ba. In this case, the corresponding whole body regions Ba and values of a reliability are stored into a descending order of a reliability in the detected person table 32c. After the process in S9, a person feature data extraction process (S10) is executed. With reference to FIGS. 8 to 10, the person feature data extraction process will be described.

FIG. 8 is a flowchart illustrating the person feature data extraction process. In the person feature data extraction process, first, a position in the detected person table 32c, that is, a counter variable N (hereinafter, the counter variable N will be abbreviated to "N") indicating "No." in FIG. 6(b) is set to 1 (S30). After the process in S30, all deletion counters in the performer table 32d are decremented by 1 (S31). After the process in S31, the N-th whole body region Ba in the detected person table 32c is acquired (S32).

After the process in S32, it is checked whether a reliability of the acquired whole body region Ba is equal to or more than 80% (S33). In a case where a reliability of the acquired whole body region Ba is equal to or more than 80% in the process in S33 (S33: Yes), it can be determined that the "human-likeness" of the person H included in the whole body region Ba is high, and thus a region corresponding to 30% of the upper part of the whole body region Ba is acquired to detect the face region Fa from the whole body region Ba (S34).

After the process in S34, the face region Fa of the person H is detected from an image in the image memory 32a corresponding to the region acquired in the process in S34, and is stored into an N-th field in the detected person table 32c (S35). In this case, the orientation Fd of the face of the person H included in the face region Fa and a reliability representing the human-likeness of the person H are also calculated, and values thereof are also stored into the detected person table 32c. Detection of the face region Fa and the orientation Fd of the face in the process in S35 is performed according to a well-known technique which may be, for example, person recognition inference using image recognition based on machine learning.

After the process in S35, vector data in the whole body region Ba is calculated on the basis of an image in the image memory 32a corresponding to the N-th whole body region Ba in the detected person table 32c, and is stored in the N-th field in the detected person table 32c (S36). Specifically, an image corresponding to the N-th whole body region Ba in the detected person table 32c among the images in the image memory 32a is acquired, and vector data is calculated on the basis of a luminance histogram of the acquired image. After the process in S36, similarity processing (S37) is executed. Here, with reference to FIG. 9, the similarity processing will be described.

FIG. 9 is a flowchart illustrating the similarity processing. In the similarity processing, first, the maximum value Smax of a cosine similarity (%) is set to 0%, a position in the performer table 32d, that is, a counter variable M (hereinafter, the counter variable M will be abbreviated to "M") indicating "No." in FIG. 6(e) is set to 1, and the maximum value Mmax of the position in the performer table 32d is set to 0 (S50)

After the process in S50, a cosine similarity (cosine distance) based on a product between N-th vector data in the detected person table 32c and M-th vector data in the performer table 32d is calculated (S51). After the process in S51, it is checked whether the cosine similarity calculated in the process in S51 is larger than the maximum value Smax of the cosine similarity (S52).

In a case where the cosine similarity calculated in the process in S51 is larger than the maximum value Smax of the cosine similarity in the process in S52 (S52: Yes), there is a high probability that the N-th person H in the detected person table 32c may be the same as the M-th person H in the performer table 32d, and thus the maximum value Mmax of the position in the performer table 32d is set to M (S53), and the cosine similarity calculated in the process in S51 is set to the maximum value Smax of the cosine similarity (S54). On the other hand, in a case where the cosine similarity calculated in the process in S51 is equal to or smaller than the maximum value Smax of the cosine similarity in the process in S52 (S52: No), the processes in S53 and S54 are skipped.

After the processes in S52 and S54, 1 is added to M (S55), and it is checked whether a value of M is greater than the number of the persons H registered in the performer table 32d (S56). In a case where the value of M is equal to or smaller than the number of the persons H registered in the performer table 32d in the process in S56 (S56: No), there is the person H in the performer table 32d in which a cosine similarity is not compared through the processes in S51 to S55, and thus the process in S51 and the subsequent processes are repeatedly executed.

In a case where the value of M is greater than the number of the persons H registered in the performer table 32d in the process in S56 (S56: Yes), the maximum value Smax of the cosine similarity calculated through the processes in S52 to S54 is equal to or more than 80% (S57).

In a case where the maximum value Smax of the cosine similarity is equal to or more than 80% in the process in S57 (S57: Yes), it can be determined that the N-th person H in the detected person table 32c is the same as the Mmax-th person H in the performer table 32d, and, thus, in this case, first, the Mmax-th part in the performer table 32d is checked (S58).

In a case where the Mmax-th part in the performer table 32d is vocal or a guitar in the process in S58 (S58: vocal, guitar), it is checked whether a lower end of the N-th whole body region Ba in the detected person table 32c is included in the foot region Ft in the foot region memory 32e (S59).

In a case where the lower end of the N-th whole body region Ba in the detected person table 32c is included in the foot region Ft in the foot region memory 32e in the process in S59 (S59: Yes), the N-th data in the detected person table 32c is copied to the Mmax-th current information in the performer table 32d (S60). Therefore, among the persons H who may move around vocal or playing guitars, only the person H whose lower end of the whole body region Ba is included in the foot region Ft, that is, only the whole body region Ba and the face region Fa of the person H at a position desired to be detected by a user can be easily and reliably updated in the performer table 32d.

In a case where the Mmax-th part in the performer table 32d is a drum or a keyboard in the process in S58 (S58: drum, keyboard), the process in S59 is skipped. In a case of the person H who is unlikely to move around playing a drum or a keyboard, there is little concern that the lower end of the whole body region Ba thereof will deviate from the foot region Ft. Therefore, the process in S59 is skipped, and thus it is possible to rapidly perform an update process on the performer table 32d. Even in a case where the part is a drum or a keyboard in the process in S58, the process in S59 may be executed.

After the process in S60, the Mmax-field in the performer table 32d can be updated through the processes in S58 to S60, and thus the Mmax-th deletion counter in the performer table 32d is set to 150 as an initial value (S61).

In a case where the maximum value Smax of the cosine similarity is less than 80% in the process in S57 (S57: No), it can be determined that the N-th person H in the detected person table 32c is not registered in the performer table 32d, and, thus, first, it is checked whether a reliability of the N-th whole body region Ba in the detected person table 32c is equal to or more than 90% (S62).

In a case where a reliability of the N-th whole body region Ba in the detected person table 32c is equal to or more than 90% in the process in S62 (S62: Yes), a performer registration process (S63) is executed. Here, with reference to FIG. 10(a), the performer registration process will be described.

Figure 10A:
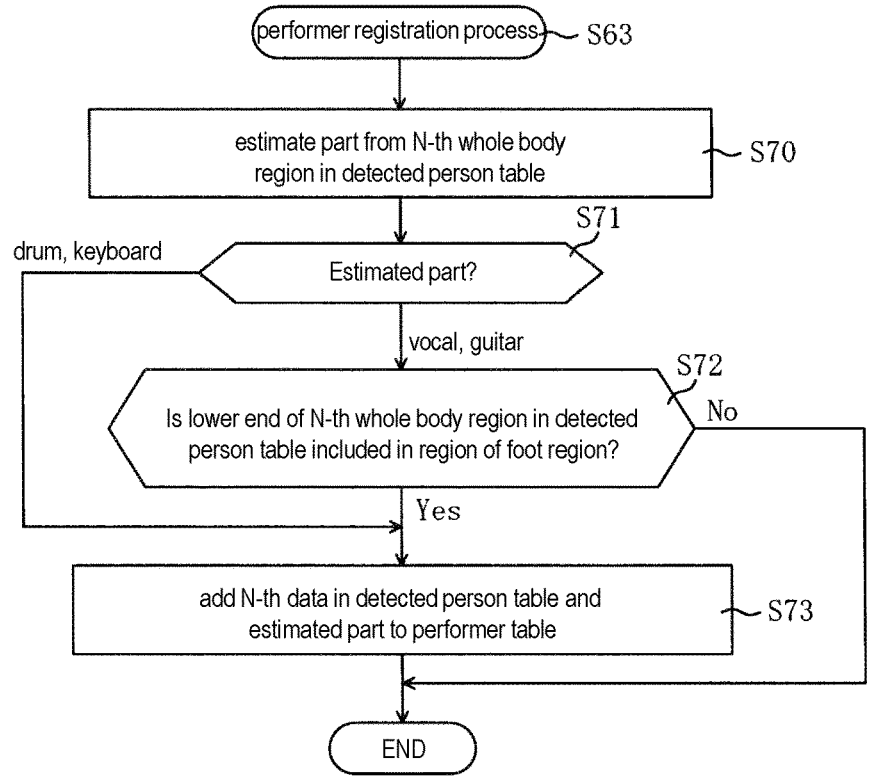
FIG. 10(a) is a flowchart illustrating a performer registration process.

FIG. 10(a) is a flowchart illustrating the performer registration process. In the performer registration process, first, a part of the person H is estimated from the N-th whole body region Ba in the detected person table 32c (S70). Estimation of a part in the process in S70 is performed according to a well-known technique which may be, for example, performance part recognition inference using image recognition based on machine learning. After the process in S70, the estimated part is checked (S71). In a case where the estimated part is vocal or a guitar in the process in S71 (S71: vocal, guitar), it is checked whether a lower end of the N-th whole body region Ba in the detected person table 32c is included in the foot region Ft in the foot region memory 32e (S72).

In a case where the lower end of the N-th whole body region Ba in the detected person table 32c is included in the foot region Ft in the foot region memory 32e in the process in S72 (S72: Yes), the N-th data in the detected person table 32c and the part estimated in the process in S70 are copied to the performer table 32d (S73).

Consequently, in the same manner as in the process in S59 in FIG. 9, among the persons H who may move around vocal or playing guitars, only the person H whose lower end of the whole body region Ba is included in the foot region Ft, that is, the whole body region Ba and the face region Fa of the person H at a position desired to be detected by a user can be easily and reliably added to the performer table 32d. In this case, the N-th whole body region Ba and face region Fa and reliabilities thereof are stored in the registration time information and the current information in the performer table 32d, and the deletion counter is set to 150 as an initial value.

In this case, in the performance part recognition inference exemplified in the process in S70, since a part of the person H is estimated, and a region of a musical instrument played by the person H can also be detected, coordinates and a size of the whole body region Ba in the N-th data in the detected person table 32c may be corrected in accordance with the region of the musical instrument detected through the performance part recognition inference. In the processes in S8 and S9 in FIG. 7, only a whole body region of the person H may be temporarily stored in the detected person table 32c without taking into consideration a played musical instrument, and an expanded region including the region of the musical instrument detected through the performance part recognition inference in the process in S71 in the whole body region Ba in the N-th data in the detected person table 32c may be stored in the performer table 32d as the whole body region Ba.

In a case where the estimated part is a drum or a keyboard in the process in S71 (S71: drum, keyboard), the process in S72 is skipped. In the same manner as in the process in S58 in FIG. 9, in a case of the person H who is unlikely to move around playing a drum or a keyboard and of which the lower end of the whole body region Ba thereof will hardly deviate from the foot region Ft, the process in S72 is skipped, and thus it is possible to rapidly perform an addition process on the performer table 32d. Even in a case where the part is a drum or a keyboard in the process in S71, the process in S72 may be executed.

Consequently, the N-th person H in the detected person table 32c, detected from the frame image F, is registered in the performer table 32d that stores a candidate for setting the cutout region C. At the time of the registration, it is checked whether a reliability of the N-th whole body region Ba in the detected person table 32c is equal to or higher than 90% that is a reliability higher than 80% that is the reliability for comparison in the process in S33 in FIG. 8 described above. Consequently, the N-th whole body region Ba in the detected person table 32c, which is considered to be more "human-like", is registered in the performer table 32d, and thus it is possible to suppress the whole body region Ba that does not include the person H from being registered in the performer table 32d.

In a case where the lower end of the N-th whole body region Ba in the detected person table 32c is not included in the foot region Ft in the foot region memory 32e in the process in S72 (S72: No), the process in S73 is skipped. After the processes in S72 and S73, the performer registration process is finished.

FIG. 9 is referred to again. In a case where the lower end of the N-th whole body region Ba in the detected person table 32c is not included in the foot region Ft in the foot region memory 32e in the process in S59 (S59: No), and the reliability of the N-th whole body region Ba in the detected person table 32c is lower than 90% in the process in S62 (S62: No), after the process in S61 or after the process in S63, the similarity processing is finished.

FIG. 8 is referred to again. After the similarity processing in S37, 1 is added to N (S38), and it is checked whether N as an addition result is greater than the number of persons H registered in the detected person table 32c (S39). In a case where N is equal to or smaller than the number of persons H registered in the detected person table 32c in the process in S39 (S39: No), there is the whole body region Ba on which the processes in S32 to S37 are not executed yet, and the process in S32 and the subsequent processes are repeatedly executed.

In a case where the reliability of the whole body region Ba is lower than 80% in the process in S33 (S33: No), the processes in S34 to S39 are skipped. Consequently, the whole body region Ba of which the reliability is lower than 80% is excluded from a target on which the similarity processing in S37 is executed. In a case where the reliability of the whole body region Ba is lower than 80% in the process in S33 (S33: No), or N is greater than the number of persons H registered in the detected person table 32c in the process in S39 (S39: Yes), a performer update process (S40) is executed. Here, with reference to FIG. 10(b), the performer update process will be described.

Figure 10B:
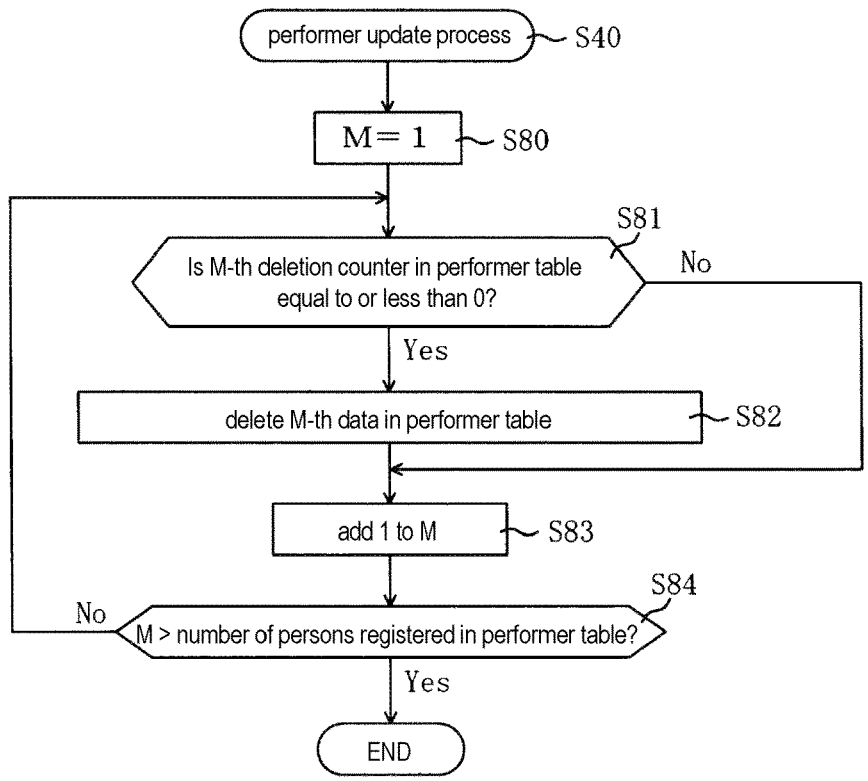
FIG. 10(b) is a flowchart illustrating a performer update process.

FIG. 10(b) is a flowchart illustrating the performer update process. In the performer update process, first, the counter variable M indicating the position in the performer table 32d is set to 1 (S80). After the process in S80, it is checked whether the M-th deletion counter in the performer table 32d is equal to or less than 0 (S81).

In a case where the M-th deletion counter in the performer table 32d is equal to or less than 0 in the process in S81 (S81: Yes), the M-th data in the performer table 32d is deleted (S82). On the other hand, the M-th deletion counter in the performer table 32d is more than 0 in the process in S81 (S81: No), the process in S82 is skipped.

After the processes in S81 and S82, 1 is added to M (S83), and it is checked whether M as an addition result is greater than the number of persons H registered in the performer table 32d (S84). In a case where M is equal to or smaller than the number of persons H registered in the performer table 32d in the process in S84 (S84: No), the process in S81 and the subsequent processes are repeatedly executed.

In a case where M is greater than the number of persons H registered in the performer table 32d in the process in S84 (S84: Yes) the performer update process is finished. As described above, in the performer update process, among the persons H stored in the performer table 32d, the same person H as the person H stored in the detected person table 32c is stored in the performer table 32d without any change, and the person H who does not match the person H stored in the detected person table 32c and for whom a deletion counter is 0 is deleted from the performer table 32d. Consequently, it is possible to prevent the performer table 32d from continuously storing information regarding the person H unrelated to the person H stored in the detected person table 32c, and thus a capacity required for the performer table 32d can be saved.

FIG. 8 is referred to again. After the performer update process in S40, the person feature data extraction process is finished.

FIG. 7 is referred to again. After the person feature data extraction process in S10, an output mode that is input from the user via the input device 2 is checked (S11). Here, with reference to FIG. 11, an output mode and a screen displayed on the display device 3 will be described.

Figure 11A:
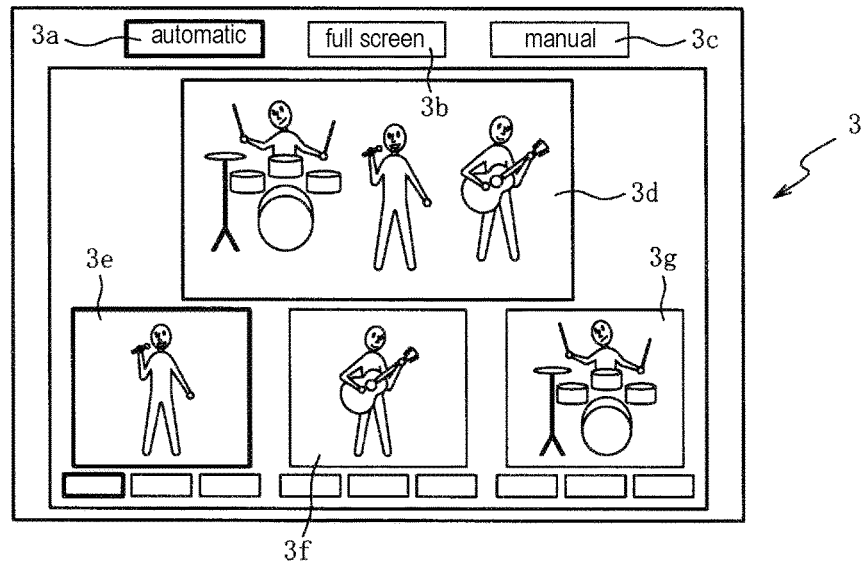
FIG. 11(a) is a diagram illustrating display details of a display device in a case where an automatic cutout mode is selected as an output mode.

FIG. 11(a) is a diagram illustrating display details of the display device 3 in a case where an automatic cutout mode is selected as an output mode. In the present embodiment, an output mode for setting the cutout region C includes an automatic cutout mode for setting the cutout region C on the basis of the performer table 32d, a full screen mode for setting the frame image F acquired from the switcher 10 as the cutout region C without any change, and a manual mode for setting any region that is set by the user via the input device 2 as the cutout region C in the frame image F acquired from the switcher 10.

An upper part of the screen of the display device 3 is provided with an automatic button 3a for setting the automatic cutout mode as the output mode, a full screen button 3b for setting the full screen mode as the output mode, and a manual button 3c for setting the manual mode as the output mode. The automatic button 3a, the full screen button 3b, and the manual button 3c are configured to be selectable by the user via the input device 2.

A full screen area 3d based on the frame image F is displayed under the automatic button 3a, the full screen button 3b, and the manual button 3c. In a case where the full screen button 3b is selected, a region of the entire frame image F displayed in the full screen area 3d is set as the cutout region C.

In FIG. 11(a), in a case where the automatic cutout mode is selected as the output mode, person areas 3e to 3g in which the persons H stored in the performer table 32d are displayed are displayed under the full screen area 3d. Images of the respective persons H stored in the performer table 32d are displayed in the person areas 3e to 3g. The person areas 3e to 3g are configured to be selectable by the user via the input device 2, and the cutout regions C are set on the basis of the persons H in the performer table 32d corresponding to the selected person areas 3e to 3g.

Figure 11B:
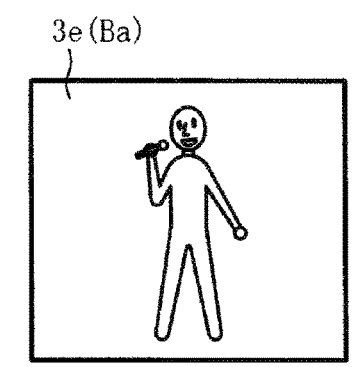
FIG. 11(b) is a diagram illustrating a case where a person area is displayed when a whole body region of a person is displayed.
Figure 11C:
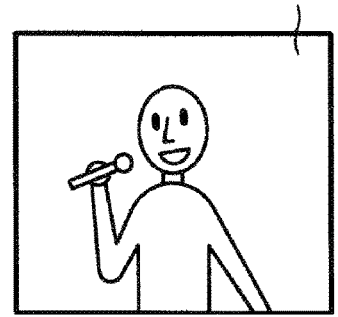
FIG. 11(c) is a diagram illustrating a case where a person area is displayed when the upper half of the body of the person is displayed.
Figure 11D:
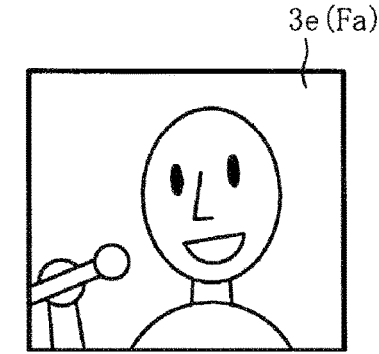
FIG. 11(d) is a diagram illustrating a case where a person area is displayed when a face region of the person is displayed.

In a case where the persons H stored in the performer table 32d are three or more persons, person areas corresponding to the number of persons are displayed in addition to the person areas 3e to 3g. In this case, the screen may be scrolled in the horizontal direction, and the person areas may be arranged in the horizontal direction of the screen such that the person areas corresponding to the number of persons can be displayed. With reference to FIGS. 11(b) to 11(d), the person areas 3e to 3g will be described.

FIG. 11(b) is a diagram illustrating a case where the person areas 3e to 3g are displayed when the whole body region Ba of the person H is displayed, FIG. 11(c) is a diagram illustrating a case where the person areas 3e to 3g are displayed when the upper half of the body of the person H is displayed, FIG. 11(d) is a diagram illustrating a case where the person areas 3e to 3g are displayed when the face region Fa of the person H is displayed. In FIGS. 11(b) to 11(d), the person area 3e will be described, but the person areas 3f and 3g are the same as the person area 3e, and thus description thereof will not be repeated.

As illustrated in FIGS. 11(b) to 11(d), a whole body button 3ea for setting the whole body region Ba of the person H as the cutout region C, an upper body button 3eb for setting the upper half of the body of the person H as the cutout region C, and a face button 3ec for setting the face region Fa of the person H as the cutout region C are provided under the person area 3e.

The whole body button 3ea, the upper body button 3eb, and the face button 3ec are configured to be selectable by the user via the input device 2, and a body part of the person H corresponding to a selected button among the whole body button 3ea, the upper body button 3eb, and the face button 3ec is selected as a region forming the cutout region C. An image based on the selected body part is also displayed in the person area 3e.

Figure 11E:
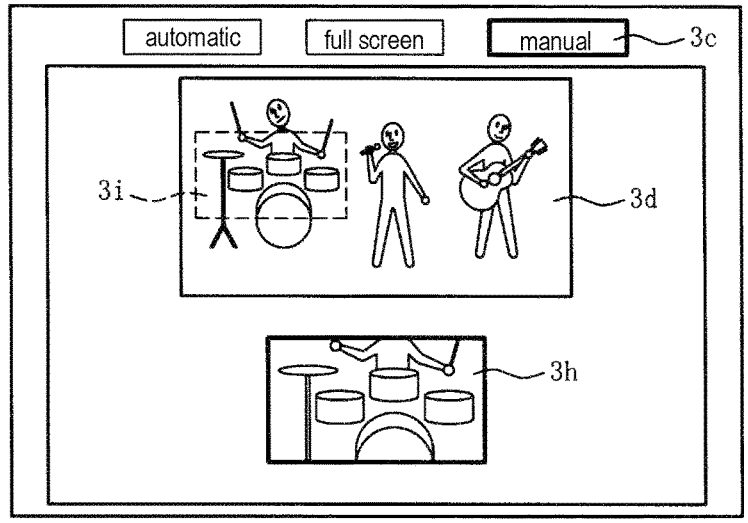
FIG. 11(e) is a diagram illustrating display details of the display device in a case where a manual mode is selected as an output mode.

Next, with reference to FIG. 11(e), a case where the manual mode is selected as the output mode will be described. FIG. 11(e) is a diagram illustrating display details of the display device 3 in a case where the manual mode is selected as the output mode. As illustrated in FIG. 11(e), in a case where the manual mode is selected as the output mode, instead of the person areas 3e to 3g, a manual display area 3h displaying an image based on any region in the frame image F selected by the user via the input device 2 is displayed. Along therewith, a selection area 3i representing the region in the frame image F selected by the user is displayed in the full screen area 3d. It is possible to easily check a position of the region in the frame image F selected by the user or an image based on the cutout region C to be cut out by using the manual display area 3h and the selection area 3i.

As described above, since the full screen mode or the manual mode is provided as the output mode in addition to the automatic cutout mode based on the performer table 32d, in a case where the automatic cutout mode is selected, the output mode is switched to the full screen mode or the manual mode even when the inappropriate cutout region C is set due to the person H in the performer table 32d being erroneously detected from the frame image F, and thus rapid switching to the cutout region C based on a full screen of the frame image F or the cutout region C selected by the user can be performed. Consequently, it is possible to suppress an inappropriate image from being transmitted to the switcher 10 and from being output to the external monitor 14 from the switcher 10.

FIG. 7 is referred to again. In a case where the output mode is the automatic cutout mode in the process in S11 (S11: automatic), an automatic cutout process (S12) is executed. Here, with reference to FIG. 12, the automatic cutout process will be described.

Figure 12:
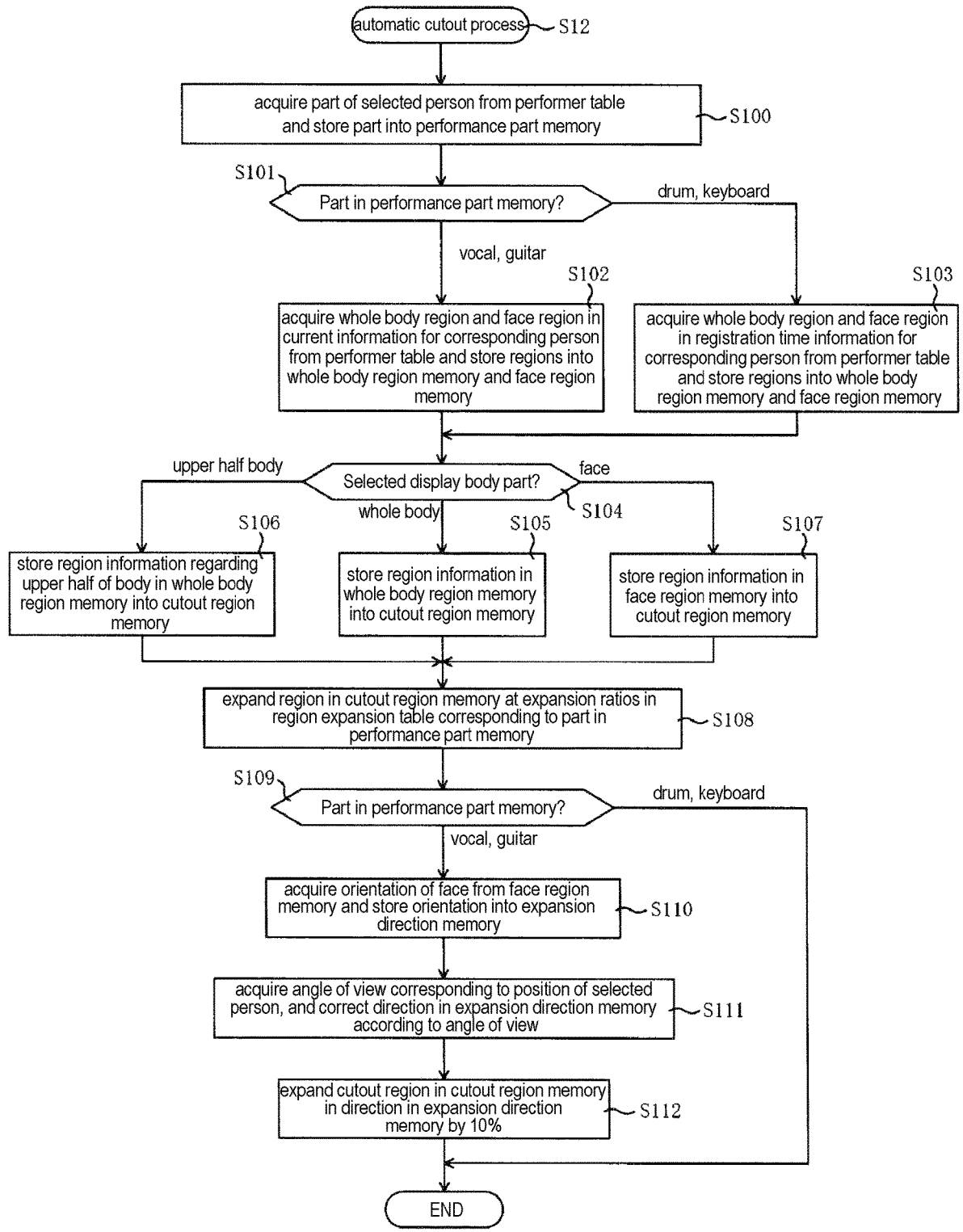
FIG. 12 is a flowchart illustrating an automatic cutout process.

FIG. 12 is a flowchart illustrating the automatic cutout process. The automatic cutout process is a process of setting the cutout region C in accordance with the person H selected by the user via the input device 2 and the display device 3 and a body part (that is, the whole body region Ba, the upper half of the body, or the face region Fa) of the person H.

In the automatic cutout process, first, information regarding the person H selected from the person areas 3e to 3g (refer to FIG. 11(a)) displayed on the display device 3 via the input device 2 is acquired from the performer table 32d (FIG. 6(e)), and a part of the person H is stored in the performance part memory 32f (S100). After the process in S100, the part to be stored in the performance part memory 32f is checked (S101).

In a case where the part in the performance part memory 32f is vocal or a guitar in the process in S101 (S101: vocal, guitar), the whole body region Ba and the face region Fa in the current information for the person H acquired in the process in S100 are acquired from the performer table 32d and are respectively stored into the whole body region memory 32g and the face region memory 32h (S102).

On the other hand, in a case where the part in the performance part memory 32*f* is a drum or a keyboard in the process in S101 (S101: drum, keyboard), the whole body region Ba and the face region Fa in the registration time information for the person H acquired in the process in S100 are acquired from the performer table 32*d* and are respectively stored into the whole body region memory 32*g* and the face region memory 32*h* (S103). The whole body region Ba and the face region Fa acquired from the performer table 32*d* in the process in S103 are not limited to the registration time information, and may be the current information.

In other words, in a case where the part in the performance part memory 32*f* is vocal or a guitar, the whole body region Ba and the face region Fa based on the latest frame image F stored in the detected person table 32*c* are acquired and are used to set the cutout region C afterward. Even for vocal part or a guitar part with large movement, it is possible to appropriately suppress the target person H from being out of a range of the cutout region C.

On the other hand, in a case where the part in the performance part memory 32*f* is a drum or a keyboard, the whole body region Ba and the face region Fa in a case where the person H stored in the performer table 32*d* is initially detected are acquired and are used to set the cutout region C afterward. In other words, in a case of the drum or the keyboard, the cutout region C is fixed to a region based on the whole body region Ba in a case where the person H is initially detected.

The drum or the keyboard is a part with small movement, that is, a small movement amount. Therefore, in a case where a part is the drum or the keyboard, since the cutout region C is fixed to a region based on the whole body region Ba in a case where the person H is initially detected, it is possible to suppress the person H from being out of a range of the cutout region C and also to suppress movement of the cutout region C. Consequently, it is possible to suppress the moving image M cut out by the cutout region C in the switcher 10 from being biased and thus to improve the visibility thereof.

After the processes in S102 and S103, a body part of the person H selected from the person areas 3*e* to 3*g* (refer to FIG. 11(*a*)) displayed on the display device 3 via the input device 2 is checked (S104). Specifically, among the whole body button 3*ea*, the upper body button 3*eb*, and the face button 3*ec* displayed on the display device 3, a body part corresponding to a button selected via the input device 2 is acquired.

In a case where the selected body part of the person H is the whole body region Ba in the process in S104 (S104: whole body), region information stored in the whole body region memory 32*g* is set as the cutout region C in the cutout region memory 32*j* (S105). In a case where the selected body part of the person H is the upper half of the body in the process in S104 (S104: upper half body), a region (for example, a region corresponding to 30% of the upper part of the whole body region Ba) corresponding to the upper half of the body of the person H is set as the cutout region C in the cutout region memory 32*j* among the pieces of region information stored in the whole body region memory 32*g* (S106). In a case where the selected body part of the person H is the face region Fa in the process in S104 (S104: face), region information stored in the face region memory 32*h* is set as the cutout region C in the cutout region memory 32*j* (S107).

After the processes in S105 to S107, the cutout region C stored in the cutout region memory 32*j* is expanded at expansion ratios in the region expansion table 31*b* (refer to FIG. 6(*a*)) corresponding to the part in the performance part memory 32*f* (S108). Consequently, the cutout region C is expanded according to the part in the performance part memory 32*f*.

After the process in S108, the part in the performance part memory 32*f* is checked (S109). In a case where the part in the performance part memory 32*f* is vocal or a guitar in the process in S109 (S109: vocal, guitar), the orientation Fd (refer to FIGS. 3(*a*) and 3(*b*)) of the face of the person H is acquired from the face region memory 32*h* and is stored into the expansion direction memory 32*i* (S110).

After the process in S110, the angle of view 2θ (refer to FIG. 3(*c*)) of the person H in the frame image F is calculated on the basis of the coordinates stored in the face region memory 32*h*, and a direction stored in the expansion direction memory 32*i* is corrected by the angle θ that is a half of the angle of view 2θ (S111). After the process in S11, the cutout region C in the cutout region memory 32*j* is expanded by 10% in the direction in the expansion direction memory 32*i* (S112). Consequently, in a case where the part in the performance part memory 32*f* is vocal or a guitar, the cutout region C in the cutout region memory 32*j* is expanded from a direction corresponding to the orientation Fd of the face in the face region memory 32*h* in the direction that is corrected according to the angle of view 2θ of the person H present in the frame image F.

In the process in S11, an expansion ratio at which the cutout region C is expanded is not limited to 10%, and may be 10% or higher, and may be 10% or lower. An expansion ratio may differ depending on a body part of the person H set as the cutout region C through the processes in S105 to S107. An expansion ratio in a case where a body part of the person H set as the cutout region C is the face region Fa may be higher than an expansion ratio in a case where a body part of the person H is the upper half of the body or the whole body. For example, an expansion ratio is 20% in a case where a body part of the person H set as the cutout region C is the face region Fa, and an expansion ratio is 10% in a case where a body part of the person H is the upper half of the body or the whole body. In the above-described way, even in a case where the face region Fa that is a region narrower than in a case where a body part of the person H is the upper half of the body or the whole body and includes the person H with large movement is set as the cutout region C, it is possible to appropriately suppress the face of the person H from being out of a range of the cutout region C.

In a case where the part in the performance part memory 32*f* is a drum or a keyboard in the process in S109 (S109: drum, keyboard), the processes in S110 to S112 are skipped. After the processes in S109 and S112, the automatic cutout process is finished.

FIG. 7 referred to again. In a case where the output mode is the full screen mode in the process in S1 (S11: full screen), the entire region of the image in the image memory 32*a*, that is, the entire region of the frame image F is set as the cutout region C in the cutout region memory 32*j* (S13). In a case where the output mode is the manual mode in the process in S11 (S11: manual), a region (a region corresponding to the selection area 3*i* in FIG. 11(*e*)) of the frame image F in the image memory 32*a*, set by the user via the input device 2, is set as the cutout region C in the cutout region memory 32*j* (S14).

After the processes in S12 to S14, the cutout region C in the cutout region memory 32*j* is output to the switcher 10 via the communication device 35 (S15). The switcher 10 outputs moving images obtained by cutting out the moving images M by using the cutout region C received from the PC 1 to the external monitor 14, and thus the moving images based on the cutout region C that is set by the PC 1 are output to the external monitor 14. Not only the switcher 10 but also, for example, the PC 1 may cut out the moving images M by using the cutout region C. In this case, moving images obtained by cutting out the moving images M by using the cutout region C may be output to the switcher 10 instead of outputting the cutout region C to the switcher 10 in the process in S15.

As described above, the description has been made on the basis of the embodiment, but it may be easily predicted that various modifications and changes can occur.

Figure 13A:
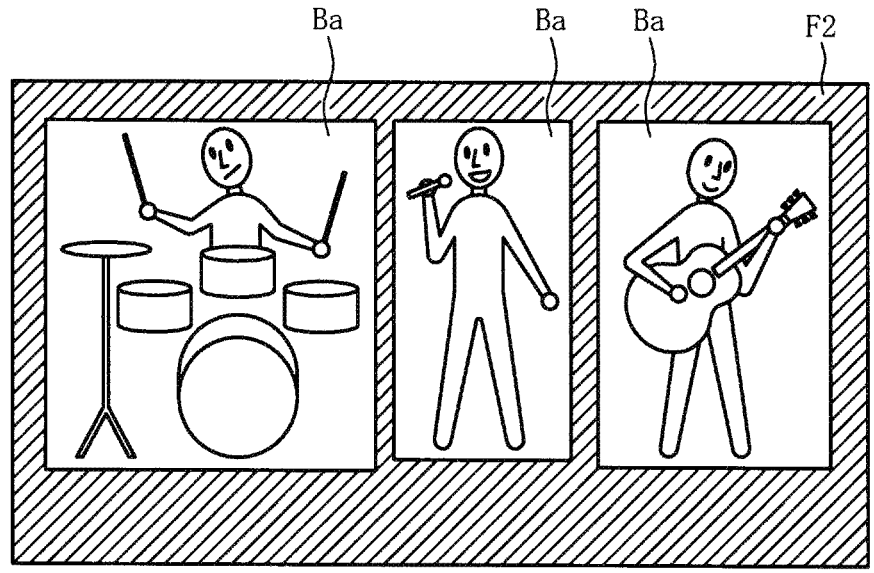
FIG. 13(a) is a diagram illustrating a detection image including a partial image based on a whole body region in a modification example.
Figure 13B:
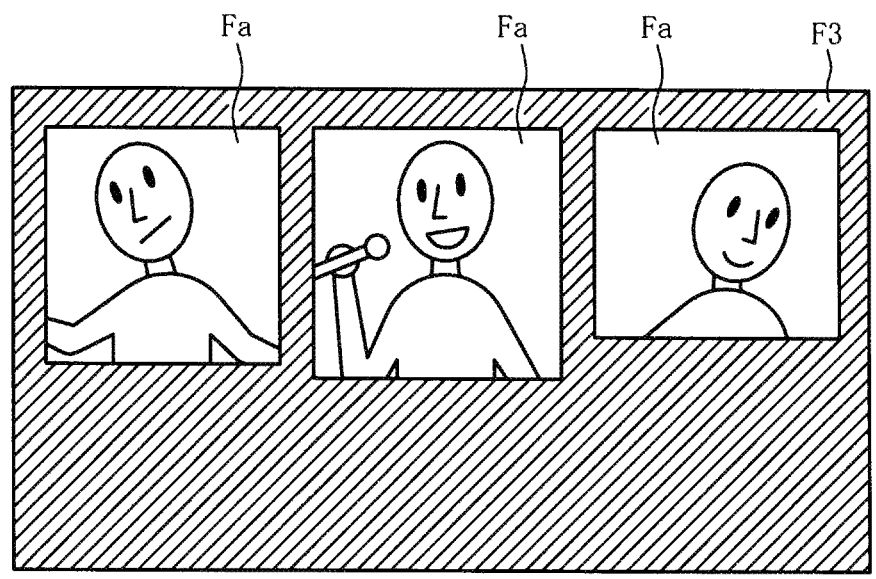
FIG. 13(b) is a diagram illustrating a detection image including a partial image based on a face region in a modification example.

In the embodiment, in the processes in S4 to S7 in FIG. 7, the detection region Da including the whole body region Ba in the detected person table 32*c* is formed, and the person H is detected from the detection region Da. However, this is only an example, and, for example, as illustrated in FIG. 13(*a*), partial images based on the whole body region Ba in the performer table 32*d* may be acquired from the frame image F in the image memory 32*a*, a detection image F2 including the partial images may be formed, and, especially, the whole body region Ba of the person H may be detected from the detection image F2. In a case where the face region Fa of the person H is detected, similarly, as illustrated in FIG. 13(*b*), partial images based on the face region Fa in the performer table 32*d* may be acquired from the frame image F in the image memory 32*a*, and the face region Fa of the person H may be detected from a detection image F3 including the partial images.

Images based on objects other than the person H can be appropriately excluded from the detection images F2 and F3, and thus it is possible to accurately and quickly detect the person H from the detection images F2 and F3.

Detection of the person H using the detection images F2 and F3 may be executed, and then the processes in S4 to S7 may be further executed. Consequently, the person H that cannot be detected through the detection of the person H using the detection images F2 and F3 can be detected through detection of the person H using the detection region Da in the processes in S4 to S7 in FIG. 7.

The detection images F2 and F3 are not limited to images formed from partial images of all of the whole body regions Ba or the face regions Fa in the detected person table 32*c* as illustrated in FIGS. 13(*a*) and 13(*b*). For example, a single detection image F2 or F3 may include only a single partial image, and a single detection image F2 or F3 may include a predetermined number of (for example, three) partial images. In this case, formation of the detection images F2 and F3 and detection of the person H from the detection images F2 and F3 may be repeatedly performed by the number of persons H stored in the detected person table 32*c*.

In the embodiment, the foot region Ft (FIG. 2(*b*)) is set in the frame image F, and the person H whose feet are present in the foot region Ft is detected in the detection region Da or the entire frame image F. However, a specific range in which the feet of the person H are detected is not limited to the foot region Ft, and, for example, a boundary such as an upper limit or a lower limit at which the feet of the person H are located is set in the frame image F, and positions of the feet of the person H to be detected may be determined. For example, in a case where an upper limit at which the feet are located is set as a boundary, the person H whose feet are located below the upper limit may be detected, and the person H whose feet are located above the upper limit does not need to be detected.

A specific range in which the person H is detected is not limited to the foot region Ft, and, for example, the specific range may be the entire stage on which the person H performs, and only the person H located in the specific range may be detected in the detection region Da or the like. Consequently, it is possible to easily and reliably detect only the person H on the stage.

On the other hand, instead of a specific range such as the foot region Ft, a non-specific range that is not a specific range does not specify the person region E is set in the frame image F, and the person H may be detected from a region in which the non-specific range is excluded from the detection region Da and the like. For example, a screen, a projector, or an LED display provided near the stage on which the person H performs is set as the non-specific range, and thus the person H projected on the screen or the like is excluded from a target forming the person region E such that only the person H performing a performance on the stage can be easily and reliably detected.

In the embodiment, in FIG. 11, in a case where the output mode is the automatic cutout mode, the person H corresponding to the person areas 3*e* to 3*g* selected by the user is set as a target for setting the cutout region C. However, this is only an example, and, for example, the sound of the moving images M acquired from the switcher 10 may be analyzed, a part to which attention is to be paid such as a solo performance guitar or vocal in acapella may be specified, and the person H of the specified part may be a target for setting the cutout region C.

Consequently, the cutout region C based on the person H to whom attention is to be paid can be automatically set without selecting the person areas 3*e* to 3*g*, and thus it is possible to reduce a work load on the user who operates the PC 1.

In a case where the PC1 has a sequencer function for automatically playing a guitar, a drum, or the like, and the musical tone output from the PC1 is output from the stage, the person H corresponding to a part that is a solo part in the musical tone output by the sequencer function may be set in the cutout region C.

In the embodiment, the person H is detected from an image having a predetermined size into which an image in the image memory 32*a* is converted in the process in S8 in FIG. 7, but this is only an example, and the person H may be detected from the image from the image memory 32*a* without changing the size thereof.

In the embodiment, vocal or a guitar has been exemplified as a part with large movement in S58 in FIG. 9, S71 in FIG. 10(*a*), and S101 and S109 in FIG. 12, but this is only an example, and a portable musical instrument such as a base or a shoulder keyboard may be a part with large movement. A drum or a keyboard has been exemplified as a part with small movement, but this is only an example, and a musical instrument disposed on a floor or a ground, such as a piano or the harp may be a part with small movement.

In the embodiment, the N-th data in the detected person table 32*c* is copied to the Mmax-th current information in the performer table 32*d* in the process in S60 in FIG. 9. This is only an example, and, along with the process in S60, a part may be estimated in the same manner as in the process in S70 in FIG. 10 by using the N-th whole body region Ba in the detected person table 32*c*, and a result thereof may be stored (updated) to the Mmax-th part in the performer table 32*d*. In this case, when estimation of the part is performed through performance part recognition inference, a region of a musical instrument played by the person H whose part is estimated can also be acquired, and thus the N-th whole body region Ba in the detected person table 32*c* copied to the Mmax-th current information in the performer table 32*d* may be corrected to include the region of the musical instrument played by the person H included in the whole body region Ba.

When the part is estimated through the performance part recognition inference in the process in S73 in FIG. 10, the whole body region Ba is corrected according to a region of a musical instrument acquired through the performance part recognition inference and is added to the performer table 32d, and an expansion ratio when the whole body region Ba is corrected is also added to the performer table 32d. When the N-th data in the detected person table 32c is copied to the Mmax-th field in the performer table 32d in the process in S60 in FIG. 9, the N-th whole body region Ba in the detected person table 32c may be corrected by using the expansion ratio stored in the Mmax-th field in the performer table 32d and then copied to the Mmax-th field in the performer table 32d.

In the embodiment, when the part is estimated by using the performance part recognition inference in the process in S73 in FIG. 10, coordinates and a size of the whole body region Ba are corrected according to a region of a musical instrument acquired through the performance part recognition inference. This is only an example, and the whole body region Ba may be corrected by using an expansion ratio for each part stored in the region expansion table 31b. In this case, an expansion ratio based on a shape of a musical instrument or a positional relationship with the person H playing the musical instrument may be stored in the region expansion table 31b.

A "musical instrument expansion table" in which an expansion ratio of the whole body region Ba based on a shape of a musical instrument played in a part or a positional relationship or the like with the person H playing the musical instrument is set for each part may be stored in the HDD 31 or the like separately from the region expansion table 31b, an expansion ratio corresponding to a musical instrument played in a part that is estimated in the process in S73 may be acquired from the "musical instrument expansion table", and the whole body region Ba may be corrected by using the acquired expansion ratio.

In the embodiment, the PC 1 has been exemplified as a computer that executes the image processing program 31a, and this is only an example, and the image processing program 31a may be executed by an information processing apparatus such as a sample or a tablet terminal. The image processing program 31a may be executed by the switcher 10. The image processing program 31a may be stored in a ROM or the like, and the disclosure may be applied to a dedicated apparatus (image processing apparatus) that executes only the image processing program 31a.

The numerical values given in the embodiment are examples, and other numerical values may be naturally employed.

What is claimed is:

1. A non-transitory computer readable medium storing an image processing program causing a computer to execute image processing, the image processing program causing the computer to execute:
    a person storage step of storing a person region that is a region that includes a person detected in a frame image and is smaller than the frame image;
    an image acquisition step of acquiring the frame image from a moving image;
    a detection region setting step of setting a detection region that is a region based on expanded regions of whole body regions of the person region stored in the person storage step in the frame image acquired in the image acquisition step, wherein the expanded regions are the whole body regions expanded according to an expansion ratio of vocal or an instrument of which the person is in charge; and
    a person detection step of detecting the person from the detection region set in the detection region setting step.

2. The non-transitory computer readable medium according to claim 1,
    wherein the computer further executes a person region acquisition step of acquiring a person region based on the person detected in the person detection step, and
    wherein the person storage step is a step of storing the person region set in the person region acquisition step.

3. The non-transitory computer readable medium according to claim 2,
    wherein the computer further executes
    a partial image acquisition step of acquiring a partial image that is an image based on the person region stored in the person storage step from the frame image acquired in the image acquisition step, and
    a detection image generation step of generating a detection image that is an image based on the partial image acquired in the partial image acquisition step, and
    wherein the person detection step is a step of detecting the person from the detection image generated in the detection image generation step.

4. The non-transitory computer readable medium according to claim 3,
    wherein the person detection step is a step of detecting the person from the detection image generated in the detection image generation step and detecting the person from the detection region set in the detection region setting step.

5. The non-transitory computer readable medium according to claim 1,
    wherein the computer further executes
    a partial image acquisition step of acquiring a partial image that is an image based on the person region stored in the person storage step from the frame image acquired in the image acquisition step, and
    a detection image generation step of generating a detection image that is an image based on the partial image acquired in the partial image acquisition step, and
    wherein the person detection step is a step of detecting the person from the detection image generated in the detection image generation step.

6. The non-transitory computer readable medium according to claim 5,
    wherein the person detection step is a step of detecting the person from the detection image generated in the detection image generation step and detecting the person from the detection region set in the detection region setting step.

7. The non-transitory computer readable medium according to claim 1,
    wherein the computer further executes a range setting step of setting a specific range including the person in the frame image acquired in the image acquisition step, and
    wherein the person detection step is a step of detecting the person present in a region that satisfies the specific range set in the range setting step and the detection region set in the detection region setting step.

8. The non-transitory computer readable medium according to claim 7,
    wherein the range setting step is a step of setting, as the specific range, a range in which a specific body part of the person in the frame image acquired in the image acquisition step is located, and wherein the person detection step is a step of detecting the person whose specific body part is present in the region that satisfies the specific range set in the range setting step and the detection region set in the detection region setting step.

9. The non-transitory computer readable medium according to claim 8, wherein the range setting step is a step of setting feet of the person as the specific body part.

10. The non-transitory computer readable medium according to claim 7, wherein the person is a performer, and wherein the range setting step is a step of setting, as the specific range, a stage on which the person performs in the frame image acquired in the image acquisition step.

11. The non-transitory computer readable medium according to claim 1, wherein the computer further executes a non-specific range setting step of setting a non-specific range that is a range not specified as a person region in the frame image acquired in the image acquisition step, and wherein the person detection step is a step of detecting the person from a region in which the non-specific range set in the non-specific range setting step is excluded from the detection region set in the detection region setting step.

12. The non-transitory computer readable medium according to claim 11, wherein the person is a performer, and wherein the non-specific range setting step is a step of setting, as the non-specific range, a screen provided around a stage on which the person performs in the frame image acquired in the image acquisition step.

13. The non-transitory computer readable medium according to claim 1, further stores a region expansion table, wherein the region expansion table stores a plurality of expansion ratios corresponding to the vocal or the instrument performed by the person, wherein the expanded regions are the whole body regions expanded according to the expansion ratio in the region expansion table corresponding to the vocal or the instrument of which the person is in charge.

14. An image processing apparatus comprising:

a person storage part that stores a person region that is a region that includes a person detected in a frame image and is smaller than the frame image;

an image acquisition part that acquires the frame image from a moving image;

a detection region setting part that sets a detection region that is a region based on expanded regions of whole body regions of the person region stored in the person storage part in the frame image acquired by the image acquisition part, wherein the expanded regions are the whole body regions expanded according to an expansion ratio of vocal or an instrument of which the person is in charge; and a person detection part that detects the person from the detection region set by the detection region setting part.

15. The image processing apparatus according to claim 14, further comprising:

a person region acquisition part that acquires a person region based on the person detected by the person detection part, wherein the person storage part stores the person region set by the person region acquisition part.

16. The image processing apparatus according to claim 15, further comprising:

a partial image acquisition part that acquires a partial image that is an image based on the person region stored in the person storage part from the frame image acquired by the image acquisition part; and a detection image generation part that generates a detection image that is an image based on the partial image acquired by the partial image acquisition part, wherein the person detection part detects the person from the detection image generated by the detection image generation part.

17. The image processing apparatus according to claim 14, further comprising:

a partial image acquisition part that acquires a partial image that is an image based on the person region stored in the person storage part from the frame image acquired by the image acquisition part; and a detection image generation part that generates a detection image that is an image based on the partial image acquired by the partial image acquisition part, wherein the person detection part detects the person from the detection image generated by the detection image generation part.

18. The image processing apparatus according to claim 14, further comprises a region expansion table, wherein the region expansion table stores a plurality of expansion ratios corresponding to the vocal or the instrument performed by the person, wherein the expanded regions are the whole body regions expanded according to the expansion ratio in the region expansion table corresponding to the vocal or the instrument of which the person is in charge.

19. An image processing method comprising:

storing a person region that is a region that includes a person detected in a frame image and is smaller than the frame image;

acquiring the frame image from a moving image;

setting a detection region that is a region based on expanded regions of whole body regions of the stored person region in the acquired frame image, wherein the expanded regions are the whole body regions expanded according to an expansion ratio of vocal or an instrument of which the person is in charge; and detecting the person from the set detection region.

20. The image processing method according to claim 19, further comprising:

acquiring the person region based on the person detected from the set detection region, wherein the storing the person region comprises storing the acquired person region.

21. The image processing method according to claim 20, further comprising:

acquiring a partial image that is an image based on the stored person region from the acquired frame image; and generating a detection image that is an image based on the acquired partial image, wherein the detecting the person from the detection image comprises detecting the person from the generated detection image.

22. The image processing method according to claim 19, further comprising:

acquiring a partial image that is an image based on the stored person region from the acquired frame image; and generating a detection image that is an image based on the acquired partial image,
wherein the detecting the person from the detection image comprises detecting the person from the generated detection image.

23. The image processing method according to claim 19, further comprises providing a region expansion table, wherein the region expansion table stores a plurality of expansion ratios corresponding to the vocal or the instrument performed by the person, wherein
the expanded regions are the whole body regions expanded according to the expansion ratio in the region expansion table corresponding to the vocal or the instrument of which the person is in charge.

* * * * *